United States Patent
Khalaj Amineh et al.

(10) Patent No.: US 11,346,813 B2
(45) Date of Patent: May 31, 2022

(54) THICKNESS VALUE RESTORATION IN EDDY CURRENT PIPE INSPECTION

(71) Applicant: Halliburton Energy Services, Inc., Houston, TX (US)

(72) Inventors: Reza Khalaj Amineh, Houston, TX (US); Ahmed E. Fouda, Spring, TX (US); Burkay Donderici, Pasadena, CA (US); Luis Emilio San Martin, Albuquerque, NM (US)

(73) Assignee: Halliburton Energy Services, Inc., Houston, TX (US)

( * ) Notice: Subject to any disclaimer, the term of this patent is extended or adjusted under 35 U.S.C. 154(b) by 543 days.

(21) Appl. No.: 16/467,644

(22) PCT Filed: Feb. 22, 2017

(86) PCT No.: PCT/US2017/018941
§ 371 (c)(1),
(2) Date: Jun. 7, 2019

(87) PCT Pub. No.: WO2018/156120
PCT Pub. Date: Aug. 30, 2018

(65) Prior Publication Data
US 2019/0339230 A1    Nov. 7, 2019

(51) Int. Cl.
*G01N 27/90*    (2021.01)
*G01V 3/12*     (2006.01)
(Continued)

(52) U.S. Cl.
CPC ....... *G01N 27/9066* (2013.01); *E21B 47/085* (2020.05); *G01V 3/12* (2013.01); *G01V 3/28* (2013.01)

(58) Field of Classification Search
CPC .... E21B 47/085; G01N 27/9066; G01V 3/12; G01V 3/28
See application file for complete search history.

(56) References Cited

U.S. PATENT DOCUMENTS

| 8,958,989 B2 | 2/2015 | Legendre et al. |
| 2009/0195244 A1 | 8/2009 | Mouget et al. |

(Continued)

FOREIGN PATENT DOCUMENTS

| WO | 2015157270 A1 | 10/2015 |
| WO | 2017196357 A1 | 11/2017 |
| WO | 2017196371 A1 | 11/2017 |

OTHER PUBLICATIONS

Arbuzov, et al., "Memory Magnetic Imaging Defectoscopy", Paper presented at the SPE Russian Oil and Gas Exploration and Production Technical Conference and Exhibition, Moscow, Russia, Oct. 2012, 10 pages.

(Continued)

*Primary Examiner* — Regis J Betsch
(74) *Attorney, Agent, or Firm* — DeLizio, Peacock, Lewin & Guerra

(57) ABSTRACT

Apparatus and methods to investigate a multiple nested conductive pipe structure can be implemented in a variety of applications. An electromagnetic pulsed tool disposed in the multiple nested conductive pipe structure in a wellbore can make a set of log measurements and provide a measured log at different depths in the multiple nested conductive pipe structure. A test setup or library can provide a set of small defect log measurements. Processing circuitry can process the set of log measurements to generate thickness estimations of the multiple nested conductive pipes and processing circuitry can process the set of small defect log measurements to generate small defect thickness estimations. Processing circuitry can solve a system of equations involving the thickness estimations and the small defect thickness estimations to generate thickness variations for the multiple nested conducted pipes over the different depths. Additional apparatus, systems, and methods are disclosed.

22 Claims, 34 Drawing Sheets

(51) Int. Cl.
   *G01V 3/28*     (2006.01)
   *E21B 47/085*   (2012.01)

(56)          References Cited

U.S. PATENT DOCUMENTS

| | | | |
|---|---|---|---|
| 2012/0123699 A1* | 5/2012 | Kawata | G01N 27/9006 |
| | | | 702/35 |
| 2013/0193953 A1 | 8/2013 | Yarbro et al. | |
| 2015/0127274 A1 | 5/2015 | Legendre et al. | |
| 2015/0338541 A1* | 11/2015 | Nichols | G01V 3/26 |
| | | | 324/338 |
| 2016/0161627 A1* | 6/2016 | Khalaj Amineh | E21B 47/085 |
| | | | 702/6 |
| 2017/0038493 A1* | 2/2017 | Wu | G01N 17/04 |
| 2018/0149019 A1* | 5/2018 | Bose | E21B 47/005 |
| 2019/0339230 A1* | 11/2019 | Khalaj Amineh | G01V 3/12 |

OTHER PUBLICATIONS

Garcia, et al., "Successful Application of a New Electromagnetic Corrosion Tool for Well Integrity Evaluation in Old Wells Completed with Reduced Diameter Tubular", Paper presented at the International Petroleum Technology Conference, Beijing, China, Mar. 2013, 12 pages.

PCT Application Serial No. PCT/US2017/018941, International Search Report & Written Opinion, dated Nov. 22, 2017, 8 pgs.

* cited by examiner (b) Logging position $Z_2$ (d) Ghost effect

THICKNESS VALUE RESTORATION IN EDDY CURRENT PIPE INSPECTION

BACKGROUND

Early detection of corrosion in well casings is crucial to ensure the integrity and the safety of the well. State-of-the-art methods for downhole corrosion detection involve running corrosion detection tools in the production tubing. Different types of corrosion detection tools include mechanical calipers, ultrasonic acoustic tools, cameras, electromagnetic flux leakage, and electromagnetic induction tools. Among all these tools, only electromagnetic (EM) induction tools can be used to detect corrosion in outer casings beyond that in which the tool is run.

Existing EM induction corrosion detection tools comprise at least one transmitting coil and at least one receiving coil. The transmitter generates a primary field that induces eddy currents inside the metallic pipes, and the receiver records secondary fields generated from the pipes. Those secondary fields bear information about the electrical properties and metal content of the pipes and can be inverted for any corrosion or loss in metal content of the pipes. When the transmitter and receiver are separate coils placed at different positions along the depth, the peak of response change to a defect can be observed twice in the log. This double peak effect is observed more often when inspecting the outer pipes in multiple pipe inspection scenarios since larger transmitter-receiver distances allow for better characterization of those pipes. The double peak effect happens when the logging process produces two maximum changes in the responses: once when the transmitter is passing the defected region and a second time when the receiver is passing the defected region. Accordingly, the true location of the defected region may be difficult to ascertain.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, mechanical, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
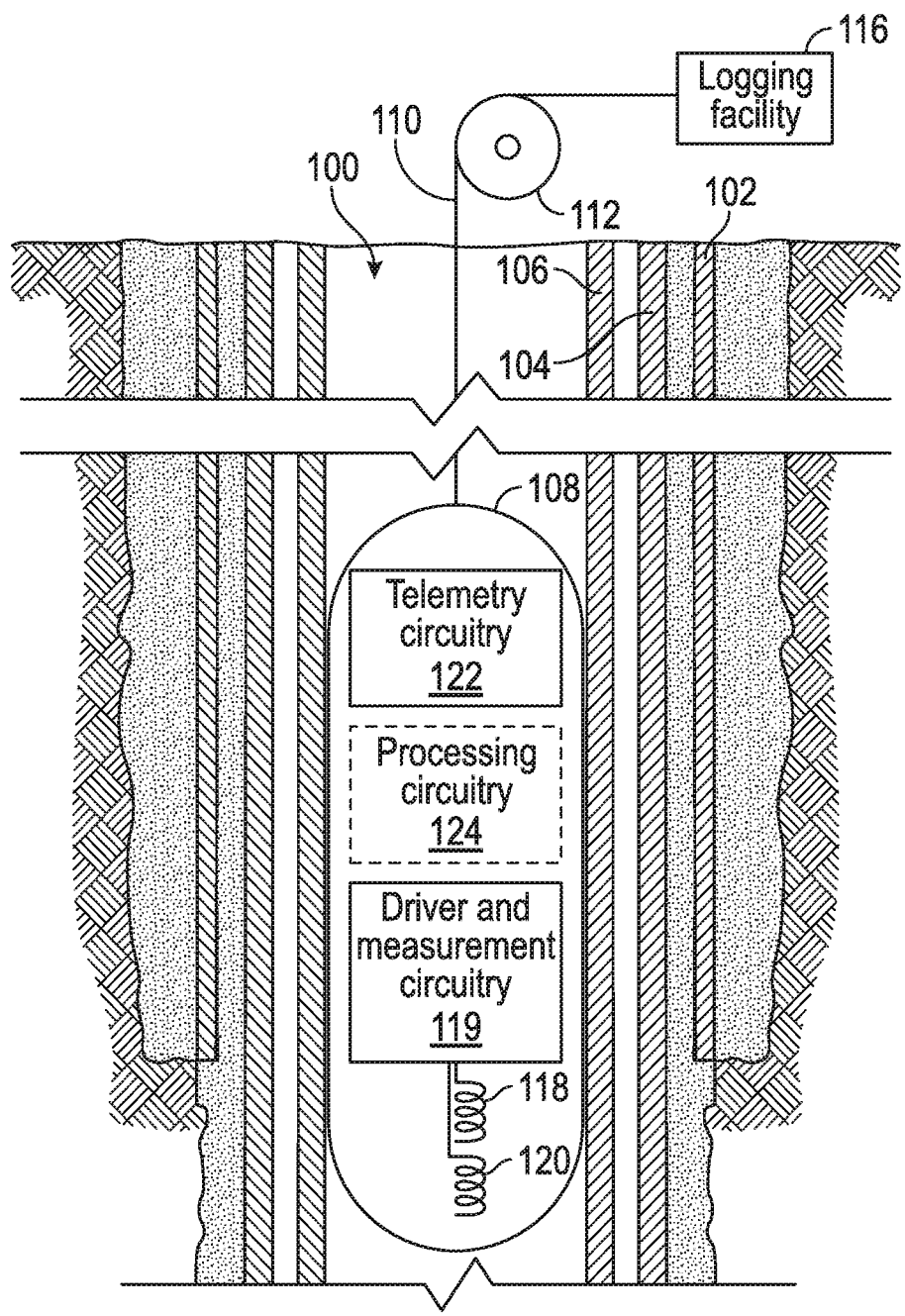
FIG. 1 is a schematic diagram of an electromagnetic pipe inspection system deployed in an example borehole environment, in accordance with various embodiments.

FIG. 1 is a diagram of an electromagnetic pipe inspection system deployed in an example borehole environment, in accordance with various embodiments. The borehole 100 is shown during a wireline logging operation, which is carried out after drilling has been completed and the drill string has been pulled out. As depicted, the borehole 100 has been completed with surface casing 102 and intermediate casing 104, both cemented in place. Further, a production pipe 106 has been installed in the borehole 100. While three pipes 102, 104, 106 are shown in this example, the number of nested pipes may generally vary, depending, e.g., on the depth of the borehole 100. As a result, the nominal total thickness of the pipes may also vary as a function of depth.

Wireline logging generally involves measuring physical parameters of the borehole 100 and/or surrounding formation—such as, in the instant case, the total thickness of the pipes 102, 104, 106—as a function of depth within the borehole 100. The pipe measurements may be made by lowering an electromagnetic logging tool 108 into the borehole 100, for instance, on a wireline 110 wound around a winch 112 mounted on a logging truck. The wireline 110 is an electrical cable that, in addition to delivering the electromagnetic logging tool 108 downhole, may serve to provide power to the electromagnetic logging tool 108 and transmit control signals and/or data between the electromagnetic logging tool 108 and a logging facility 116 (implemented, e.g., with a suitably programmed general-purpose computer including one or more processors and memory) located above surface, e.g., inside the logging truck. In some embodiments, the electromagnetic logging tool 108 is lowered to the bottom of the region of interest and subsequently pulled upward, e.g., at substantially constant speed. During this upward trip, the electromagnetic logging tool 108 may perform measurements on the pipes, either at discrete positions at which the electromagnetic logging tool 108 halts, or continuously as the pipes pass by.

In accordance with various embodiments, the electromagnetic logging tool 108 used for pipe inspection is a frequency-domain eddy-current tool configured to generate, as the electromagnetic excitation signal, an alternating primary field that induces eddy currents inside the metallic pipes, and to record, as the electromagnetic response signal, secondary fields generated from the pipes; these secondary fields bear information about the electrical properties and metal content of the pipes, and can be inverted for any corrosion or loss in metal content of the pipes. The electromagnetic logging tool 108 generally includes one or more transmitters (e.g., transmitter coil 118) that transmit the excitation signals and one or more receivers (e.g., receiver coil 120) to capture the response signals. The transmitter and receiver coils 118, 120 are spaced apart along the axis of the electromagnetic logging tool 108 and, thus, located at slightly different depths within the borehole 100; the transmitter-receiver distance may be, e.g., in the range from 20 inches to 80 inches. The tool may be configured to operate at multiple frequencies, e.g., between about 0.5 Hz and about 4 Hz. The electromagnetic logging tool 108 further includes, associated with the transmitter(s) and receiver(s), driver and measurement circuitry 119 configured to operate the electromagnetic logging tool 108 at the selected frequency.

The electromagnetic logging tool 108 may further include telemetry circuitry 122 for transmitting information about the measured electromagnetic response signals to the logging facility 116 for processing and/or storage thereat, or memory (not shown) for storing this information downhole for subsequent data retrieval once the electromagnetic logging tool 108 has been brought back to the surface. Optionally, the electromagnetic logging tool 108 may contain analog or digital processing circuitry 124 (e.g., an embedded microcontroller executing suitable software) that allows the measured response signals to be processed at least partially downhole (e.g., prior to transmission to the surface). From a sequence of measurements correlated with the depths along the borehole 100 at which they are taken (corresponding to different axial positions along the pipe), a log of the pipe thickness can be generated. The computer or other circuitry used to process the electromagnetic excitation and response signals to compute the phase of the mutual impedance between transmitter and receiver and derive the total pipe thickness based thereon is hereinafter referred to as the processing facility, regardless whether it is contained within the electromagnetic logging tool 108 as processing circuitry 124, provided in a separate device such as logging facility 116, or both in part. Collectively, the electromagnetic logging tool 108 and processing facility (e.g., 124 and/or 116) are herein referred to as a pipe inspection system.

Alternatively to being conveyed downhole on a wireline, as described above, the electromagnetic logging tool 108 can be deployed using other types of conveyance, as will be readily appreciated by those of ordinary skill in the art. For example, the electromagnetic logging tool 108 may be lowered into the borehole 100 by slickline (a solid mechanical wire that generally does not enable power and signal transmission), and may include a battery or other independent power supply as well as memory to store the measurements until the electromagnetic logging tool 108 has been brought back up to the surface and the data retrieved. Alternative means of conveyance include, for example, coiled tubing or downhole tractor.

In the EC techniques, when the transmitter coil 118 and receiver coil 120 are separate coils placed at different positions along the depth, the peak of response change due to a defect can be observed twice in the log. This effect is referred to as a ghost effect, also is referred to as double indication of defects. The ghost effect is observed more often when inspecting the outer pipes in multiple pipe inspection scenarios, since larger transmitter-receiver distances allow for better characterization of those pipes. This double peak effect is generated because, during the logging process, the defects produce two maximum changes in the responses: once when the transmitter coil 118 is passing the defected region and another time when the receiver coil 120 is passing the defected region, as described below with reference to FIGS. 2A-2D.

Figure 2A:
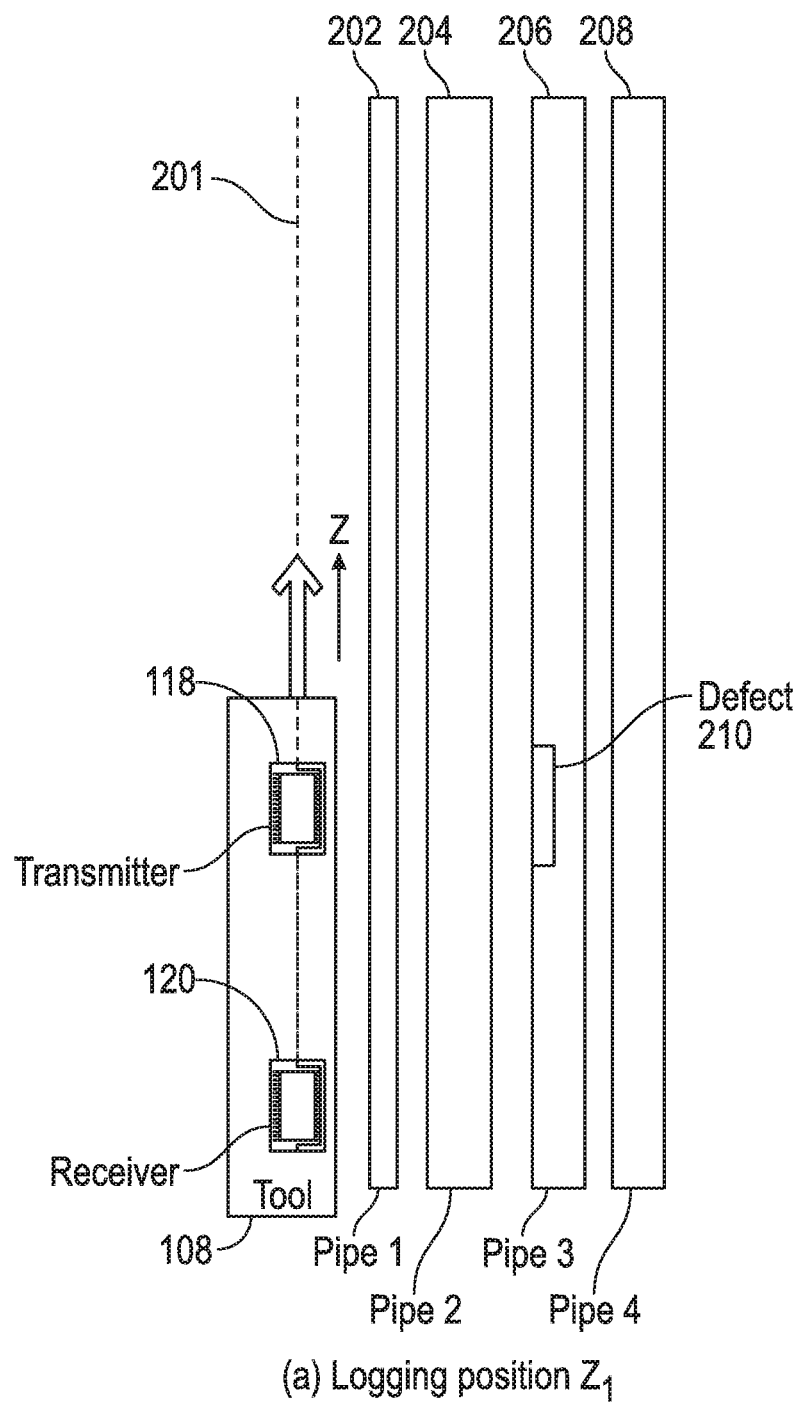
FIGS. 2A-2D illustrate the ghost effect in eddy current inspection of the pipes when the transmitter and receiver are separate coils with a large distance between them, in accordance with various embodiments.
Figure 2B:
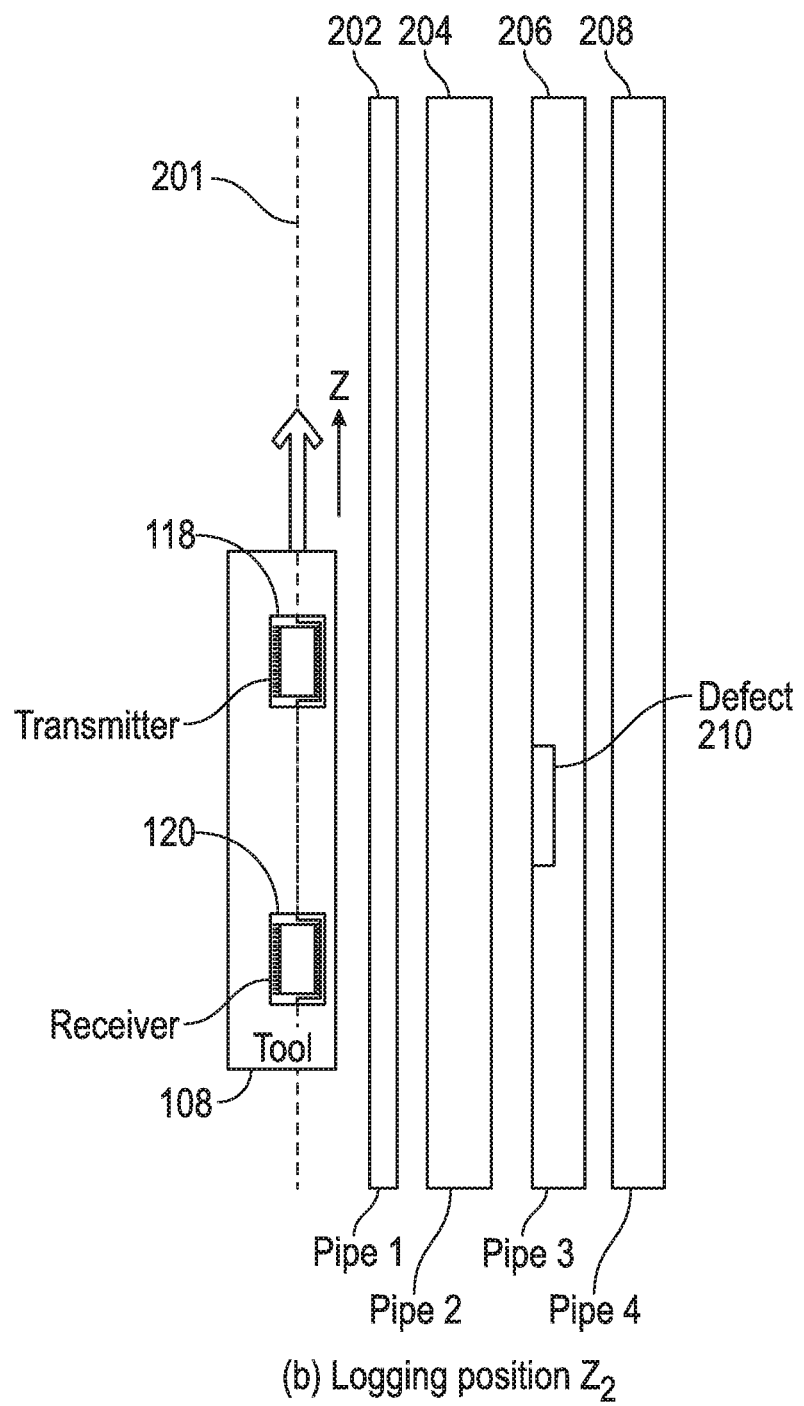
Figure 2C:
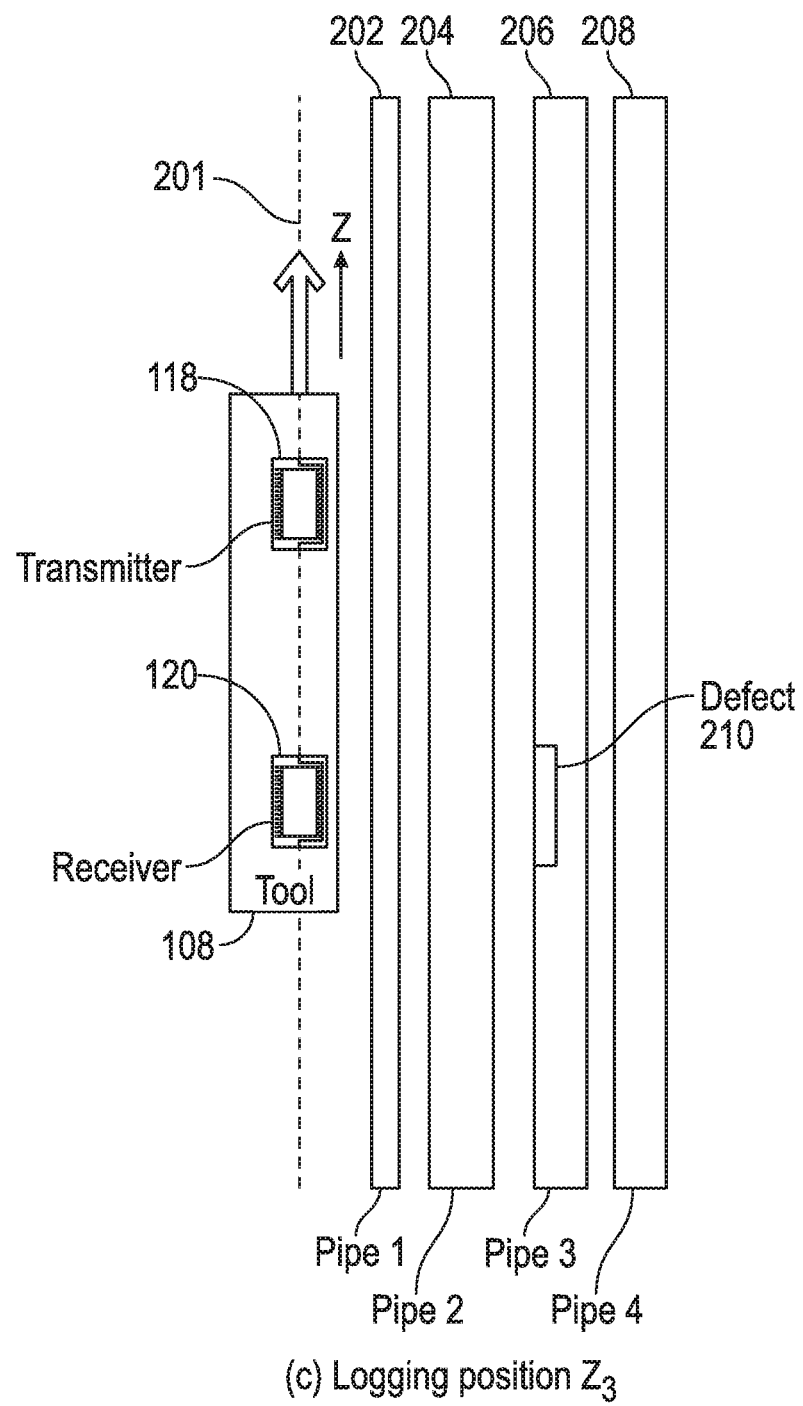
Figure 2D:
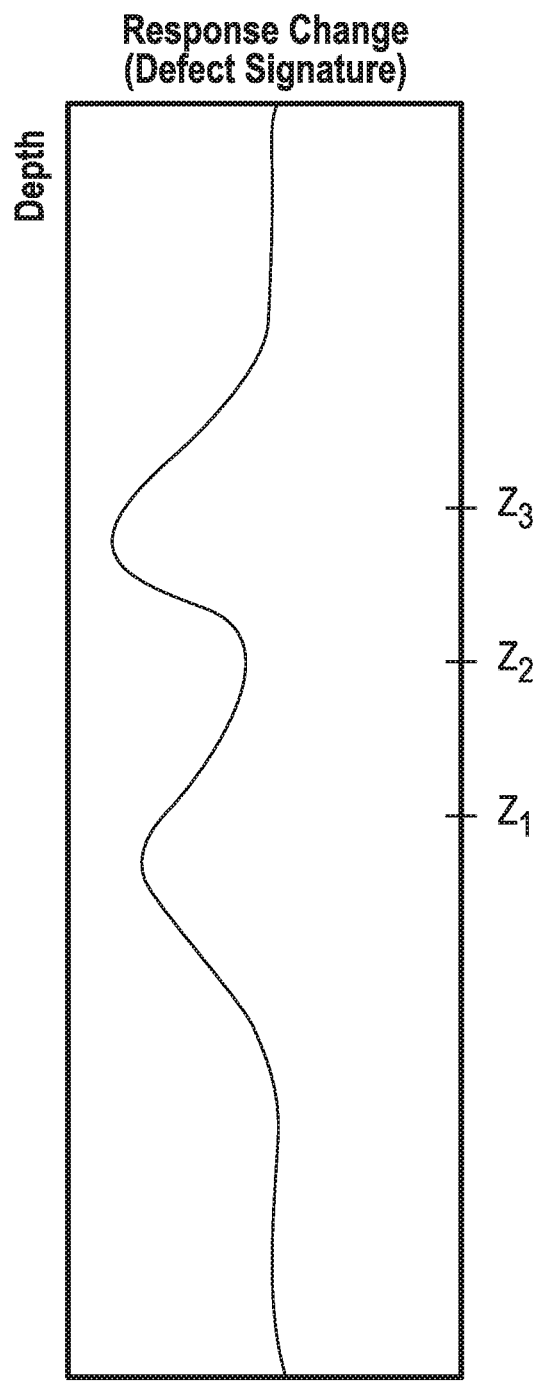

FIGS. 2A-2D illustrate the ghost effect in eddy current inspection of the pipes 202, 204, 206 and 208 when the transmitter coil 118 and the receiver coil 120 of the electromagnetic logging tool 108 are separate coils with a large distance between them. While four pipes 202, 204, 206 and 208 are shown, some systems can have more than four pipes or fewer than four pipes. FIG. 2A shows a logging position Z1 in a logging by the electromagnetic logging tool 108 along the axis 201 in the direction Z. FIG. 2B shows a logging position Z2 in the logging by the electromagnetic logging tool 108 along the axis 201 in the direction Z. FIG. 2C shows a logging position Z3 in the logging by the electromagnetic logging tool 108 along the axis 201 in the direction Z. FIG. 2D shows a ghost effect with respect to the defect 210. The response change, which may be referred to as the defect signature, due to the defect 210 has two peaks: one corresponding to the logging position Z1 where the transmitter is in front of the defect 210, and the other one corresponding to logging position Z3 where the receiver is in front of the defect 210.

Figure 3:
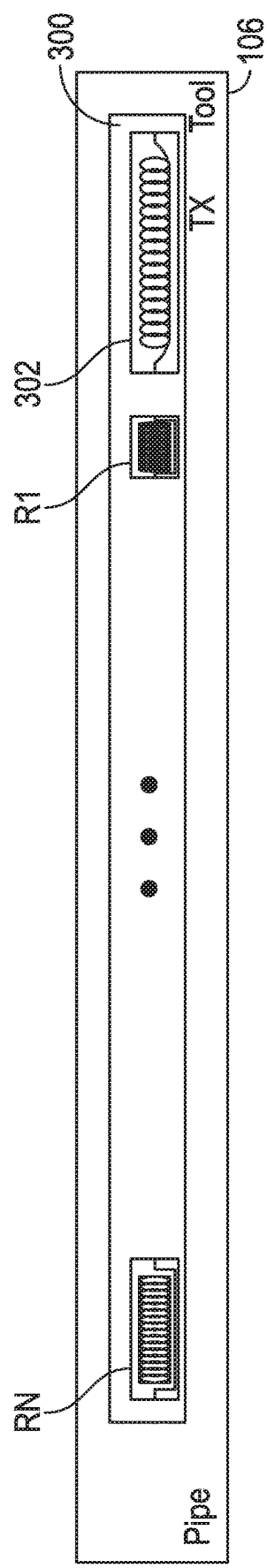
FIG. 3 is a schematic diagram of a tool for detection of corrosion and quantitative assessment of thickness in multiple pipes, in accordance with various embodiments.

FIG. 3 is a schematic diagram of a tool 300 for detection of corrosion and quantitative assessment of thickness in multiple pipes, in accordance with various embodiments. The tool 300 can be used as the electromagnetic logging tool 108 in the arrangement of FIG. 1. The tool 300 can include transmitter 302 and receivers R1 through RN, where the receivers R1 through RN are spaced apart from the transmitter 302 by different distances. In the asymmetric design, an EM field can be measured at multiple distances from the transmitter. Though one transmitter is shown, the asymmetric tool can include more transmitters. Multiple distances (TX-RX) between transmitter and receiver are included in the asymmetric tool 300 to fully measure the field distribution generated by the primary field generated by the transmitter and the secondary field generated by the pipes that surround the tool.

The receivers R1 through RN measure the electromagnetic response of the pipe system to the excitation of the transmitter 302 or multiple transmitters. The receivers R1 through RN are placed to measure the EM field distribution along the axis including both the near field as well as the far field, which are two qualitatively different regions of the response. The asymmetric tool 300 can include receiver arrays in sufficient number to record the response of defects due to corrosion on multiple pipes at multiple frequencies of operation, so that the thickness of each one of the pipes can be extracted by using an inversion scheme. An inversion scheme can be implemented to determine a value or variation of a physical property or feature by comparing measurements to the predictions of a model.

The primary field generated by a transmitter induces eddy currents in the pipes. At the receivers, both the primary field and the secondary field generated by currents induced in the pipes are present in different ratios depending on the distance between transmitter and receiver. The relative proportion of primary and secondary field measured by a receiver depends on the number of pipes, the geometry of the pipes, and the physical properties of the pipes, as well as the distance between transmitter and receiver. In the near field zone, the primary field predominates, while, in the far field, the secondary field provides the main contribution.

Figure 4A:
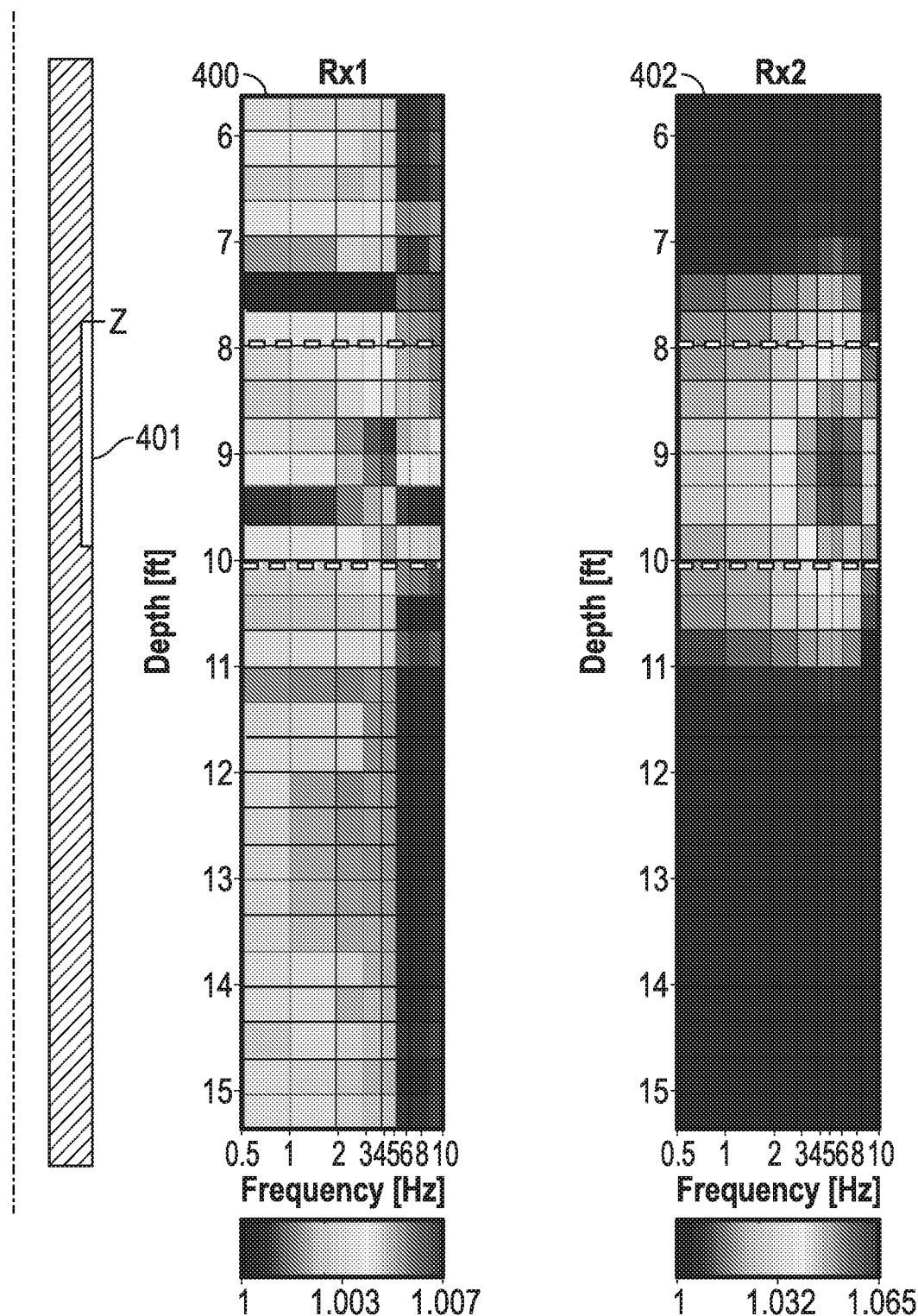
FIGS. 4A-4C illustrate the ghost effect in frequency-domain tools consisting of six receivers, in accordance with various embodiments.
Figure 4B:
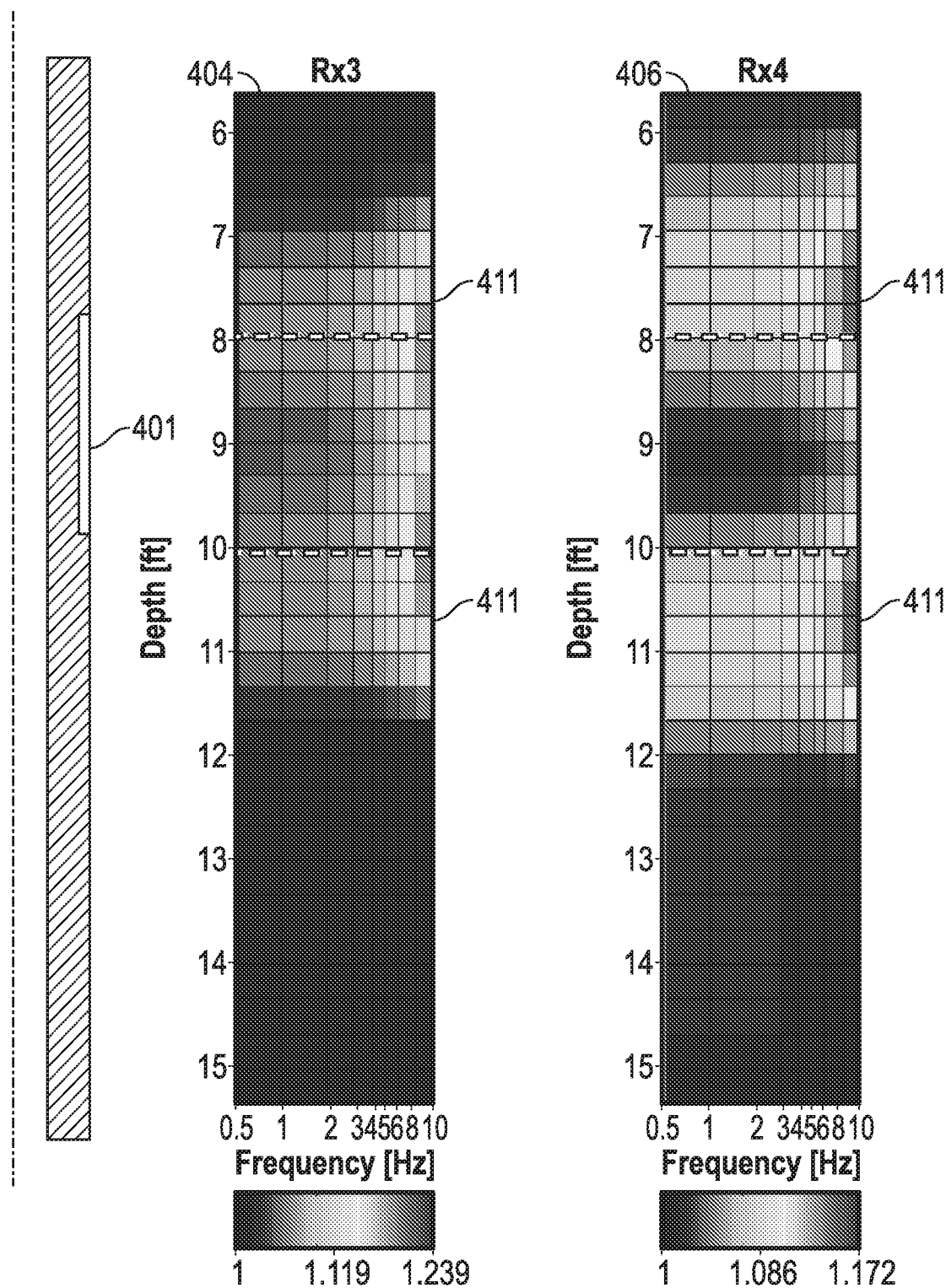
Figure 4C:
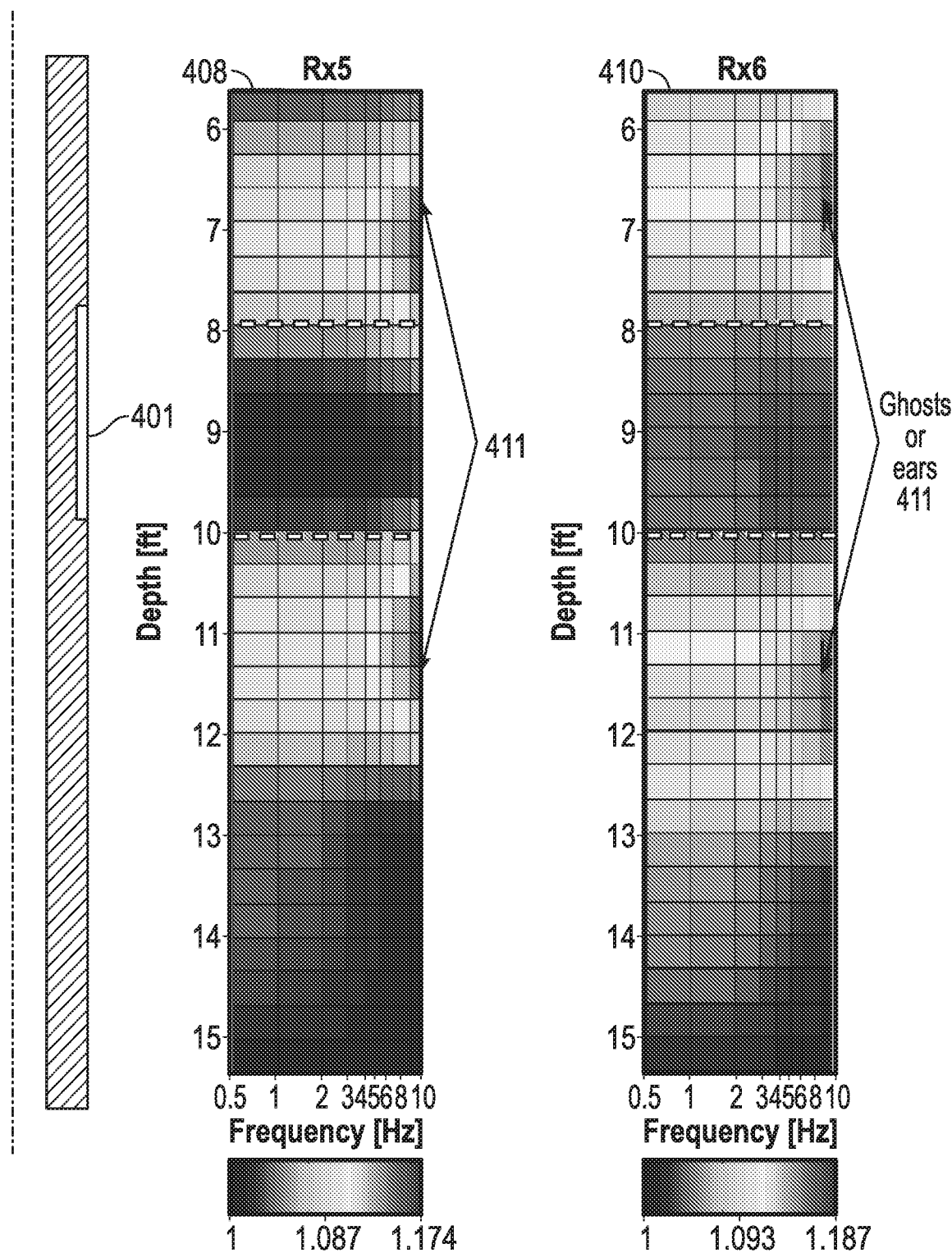

FIGS. 4A-4C illustrate the ghost effect in frequency-domain EC tools consisting of six receivers, in accordance with various embodiments. In some examples, the frequency-domain EC tools can be similar to electromagnetic logging tool 108 shown in FIG. 1 or tool 300 shown in FIG. 3. The logs illustrated correspond to measurements of a pipe with one outer defect 401 at a depth Z. While results of six receivers are shown, it will be appreciated that frequency-domain EC tools can include any number of receivers. Responses are depicted at different receivers and different frequencies.

FIG. 4A illustrates responses 400, 402 captured by receivers Rx1 and Rx2, with different distances from the transmitter coil 118 of, of pipes having a defect 401. FIG. 4B illustrates responses 404, 406 captured by receivers Rx3 and Rx4, with another set of different distances from the transmitter coil 118, of pipes having a defect 401. FIG. 4C illustrates logs 408, 410 captured by receivers Rx5 and Rx6, with yet another set of different distances from the transmitter coil 118, of pipes having a defect 401. As shown, ghosts (or ears) 411 are observed in long spacing receivers where a single defect appears as two peaks in the measured response. The spacing between the two peaks is equal to the transmitter/receiver spacing. Thus, the ghost effect makes one defect appearing as two defects at two other depths. In addition, different receivers are showing different features at the same depth (e.g., while Rx2 is showing a defect at 9 feet, Rx6 is showing two defects at 7 and 12 feet). This makes interpretation of the responses troublesome as will be explained in the following.

This ghost effect can cause errors in the inversion results to estimate the pipe thicknesses. The error would be more pronounced on the inversions results employing one-dimensional (1D) forward models. Forward modeling relates to determining a response with respect to a physical property model. These models are fast since they only take into account the variation of the structure along the radial direction (assuming the structure does not change along the azimuthal and axial directions). In inversion algorithms based on the 1D forward models, the thickness estimation of the pipes at each depth is performed from the responses acquired at that particular depth. Thus, any variation in the measured response change along the depth will be reflected in the estimated thickness of the pipes.

Figure 5:
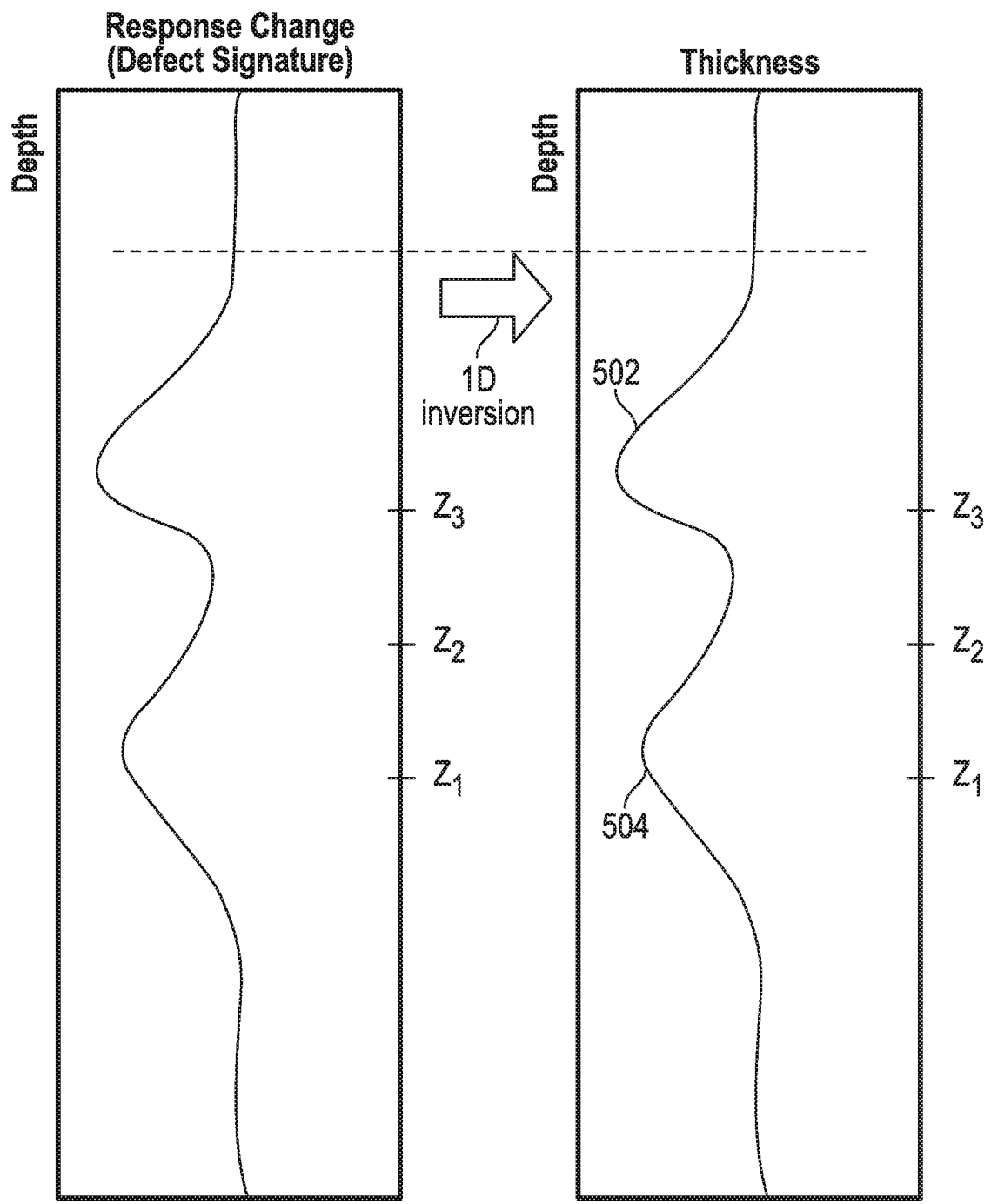
FIG. 5 is an illustration of applying 1D inversion on an acquired response that is affected by the ghost effect.

FIG. 5 is an illustration of applying 1D inversion on an acquired response that is affected by the ghost effect. For example, for a measured response change shown on the left side of FIG. 5, a similar thickness profile will be estimated for pipe 3 (two peaks 502, 504 will be observed for the defected region as if there are two defects instead of one) when employing 1D forward model as illustrated on the right side of FIG. 5.

An example of parameters of pipes and defects for a test configuration are summarized in Table 2.

TABLE 2

Parameters of the pipes and the defects used in an illustrative example.

| | Pipe | | | |
| --- | --- | --- | --- | --- |
| | 1 | 2 | 3 | 4 |
| Outer diameter (inches) | 2⅞ | 5 | 9⅝ | 13⅜ |
| Thickness (inches) | 0.21 | 0.62 | 0.54 | 0.51 |
| Relative magnetic permeability | 62 | 60 | 58 | 82 |
| Length (feet) | 20 | 20 | 20 | 20 |
| Tested defect | None | None | None | 0.05 in. × 2 ft. |
| Small defect on pipe 1 | 0.15 in. × 0.5 ft. | None | None | None |
| Small defect on pipe 2 | None | 0.15 in. × 0.5 ft. | None | none |
| Small defect on pipe 3 | None | None | 0.15 in. × 0.5 ft. | none |
| Small defect on pipe 4 | None | None | None | 0.15 in. × 0.5 ft. |

In the illustrated example, one small defect with size of 0.05 in.×2 ft. is milled in the outer wall of the fourth pipe of a nested multiple pipe structure. In this inspection scenario, the primary fields of transmitter coils of a tool (e.g., electromagnetic logging tool 108 (FIG. 1) or tool 300 (FIG. 3)) have to pass the first three pipes to reach to the fourth pipe. In addition, secondary fields have to pass the first three pipes to reach to the receivers. Thus, the attenuation of the fields inside the first three pipes makes the response due to the defect on the fourth pipe very weak. The defect itself is relatively small compared to the thickness of the fourth pipe. It can be easily appreciated by examining Table 2 that the size of the defect in the example is in the order of 10% of the thickness of the wall of the fourth pipe.

Figure 6A:
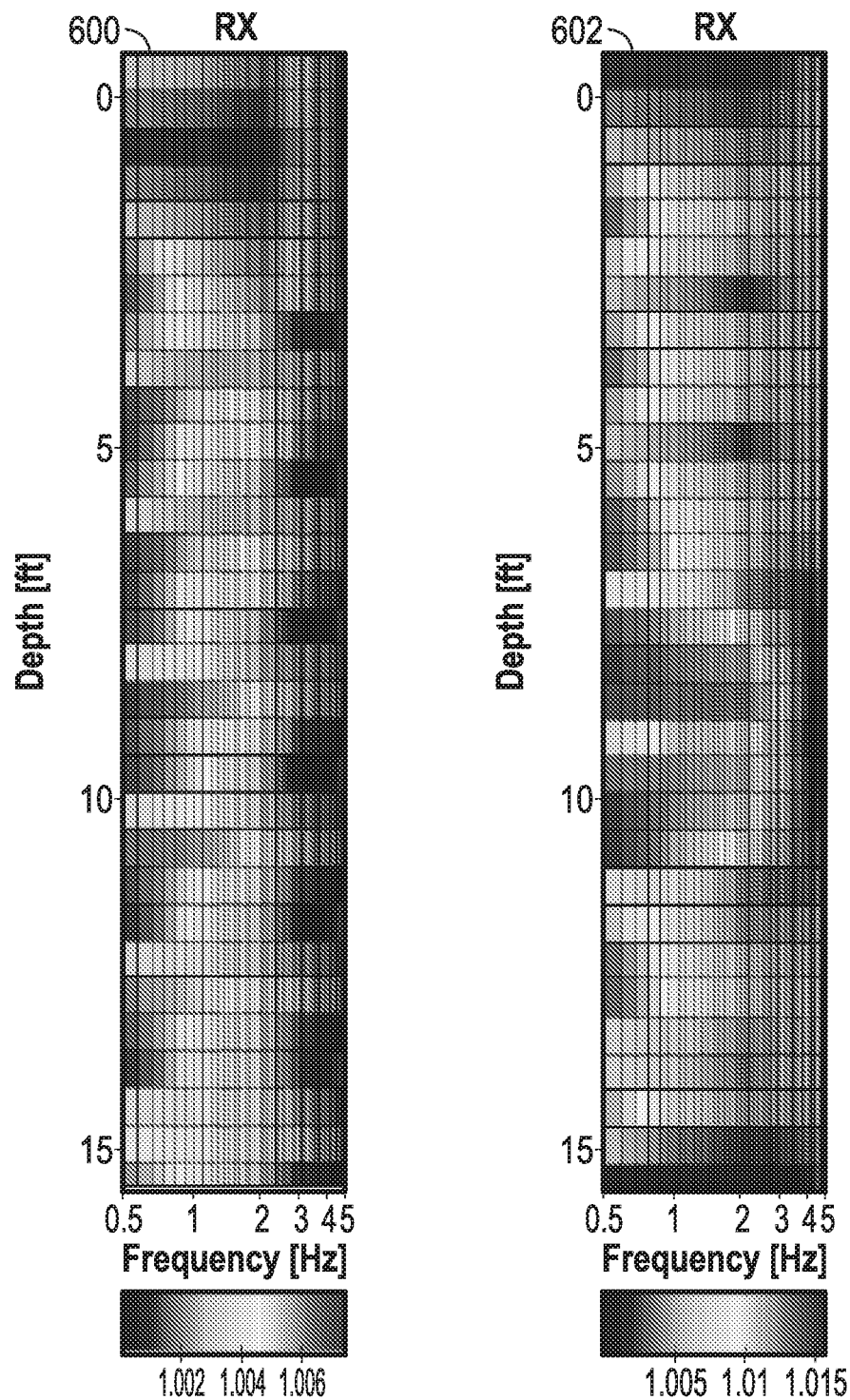
FIGS. 6A-6C illustrate raw responses of frequency-domain EC tools consisting of six receivers when measuring four pipes with one defect on the outermost pipe, in accordance with various embodiments.
Figure 6B:
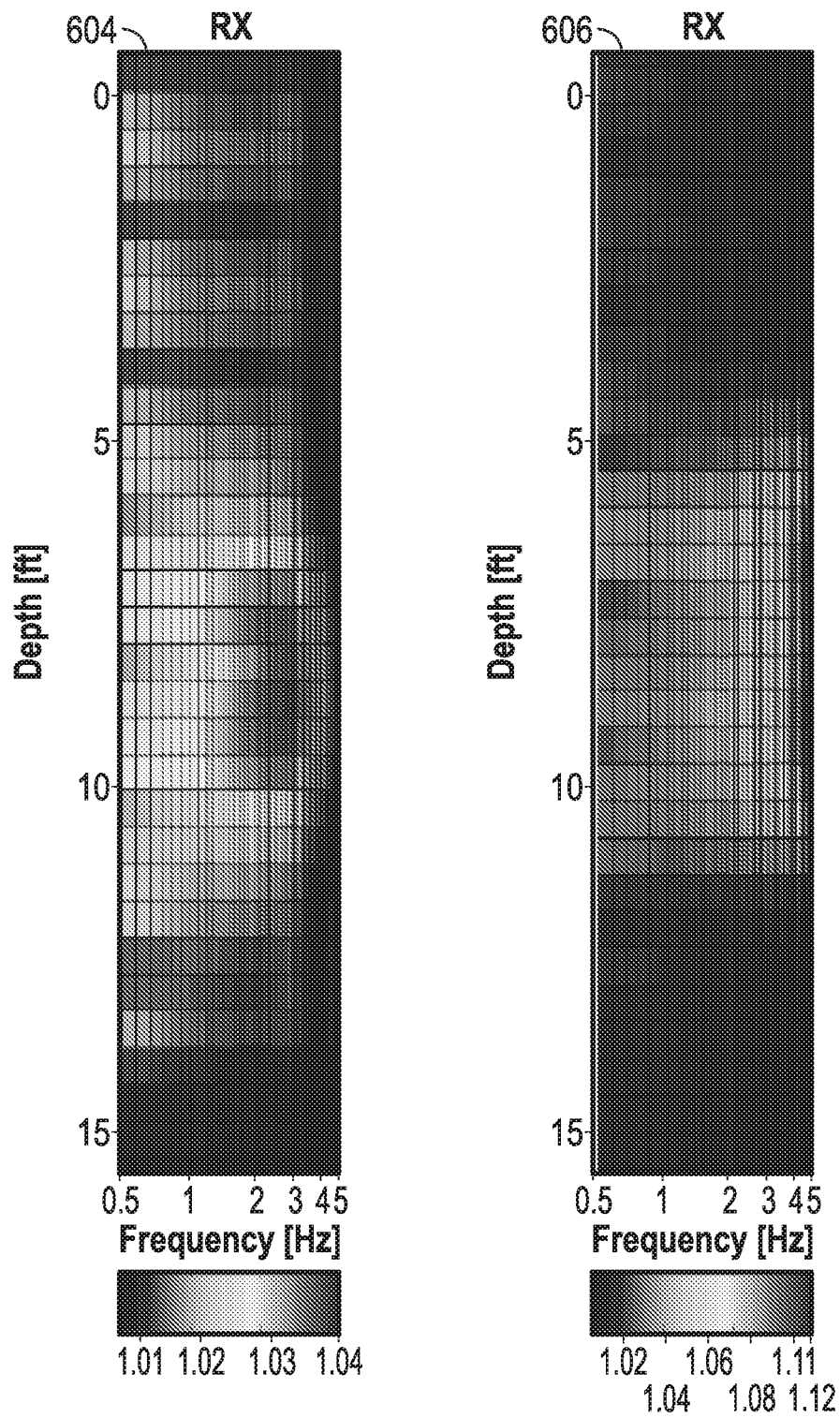
Figure 6C:
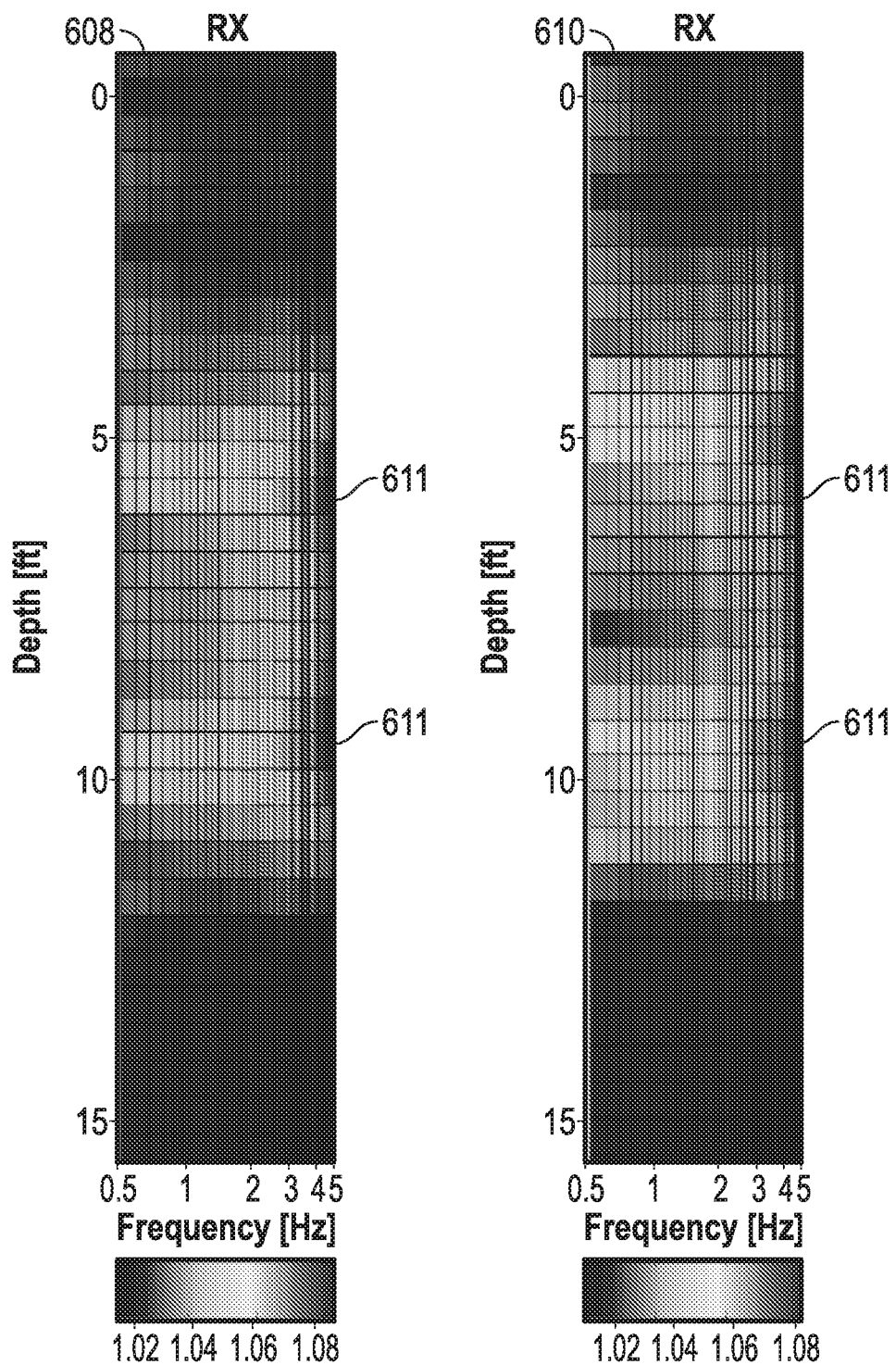

FIGS. 6A-6C illustrate raw responses of frequency-domain EC tools consisting of six receivers when measuring four pipes with one defect on the outermost pipe, as shown in Table 2, in accordance with various embodiments. Each frequency/receiver log 600, 602, 604, 606, 608, and 610 is normalized to the point that it has the minimum magnitude. In some examples, the frequency-domain EC tools used to generate frequency/receiver logs 600, 602, 604, 606, 608, and 610 can be similar to electromagnetic logging tool 108 shown in FIG. 1 or tool 300 shown in FIG. 3.

While results of six receivers are shown, it will be appreciated that frequency-domain EC tools can include any number of receivers. FIG. 6A illustrates frequency/receiver logs 600, 602 captured by receivers with two different distances from the transmitter coil 118. FIG. 6B illustrates frequency/receiver logs 604, 606 captured by receivers with another two different distances from the transmitter coil 118. FIG. 6C illustrates logs 608, 610 captured by receivers with a third different set of distances from the transmitter coil 118. As shown, and similarly to FIGS. 4A-4C, ghosts (or ears) 611 are observed in long spacing receivers where a single defect appears as two peaks in the measured response. This ghost effect can cause errors in the inversion results to estimate the pipe thicknesses.

Embodiments provide a method to reduce the ghost effect in the inversion results. Methods in accordance with various embodiments can provide improved speed of pipe characterization through the use of 1D forward model while still providing improved accuracy. Estimated thickness variations provided by methods described herein can be processed further according to restoration algorithms described below to remove the ghost effects. These restoration algorithms can reduce errors in thickness estimation from the inversion, showing pipe defects at their true depth and magnitude, and providing more accurate information as to which pipe actually includes the detected defect. Embodiments provide vertical resolution that is independent of the transmitter/receiver spacing, allowing for high resolution inspection of outer pipes. Operators may then observe an improvement in production processes.

True Thickness Restoration Algorithm

The true thickness restoration algorithm described below can reduce the ghost effect from thickness estimation results. The true thickness restoration algorithm can also reduce inversion errors, and the true thickness restoration algorithm can be applied to inversion results obtained from either a frequency-domain tool or a time-domain tool. In applying the thickness restoration algorithm of various embodiments, responses for experimental small defects on each of multiple pipes are obtained, with one defected pipe at a time through use of an EC tool. Then, an inversion algorithm is applied on the small defect responses as well as on the tested defect. In the context of embodiments, small defects are a theoretical smallest possible defect (e.g., of vanishingly small size) that can be measured with an acceptable accuracy. The acceptable accuracy can be configured to be within 1-5% of the true size of the corresponding defect.

In the discussion herein, an electromagnetic logging tool 108 (FIG. 1) is described as inspecting pipes 1 to M. It is assumed that a 1D inversion model is employed to estimate the thickness of the pipes from the measured response. Thus, after applying an inversion algorithm, the estimated thickness variations (from nominal thickness) for pipes 1 to M along the z axis (along the depth dimension) are denoted by $T_1(z)$ to $T_M(z)$. Embodiments described herein improve the quality of the estimated thicknesses $T_1(z)$ to $T_M(z)$ by applying a restoration algorithm.

In embodiments, the measurement system is assumed to be linear, in other words, when inspecting only one pipe (M=1), it is assumed that estimated thickness variation for an arbitrary defect $T_1(z)$ can be written as a convolution (using the symbol * in Equation (1) below) of estimated thickness variation on pipe 1 originating from a small defect on pipe 1 ($T_{sd1,1}(z)$) and the true thickness variation $T_{t1}(z)$ according to:

$$T_1(z) = T_{sd1,1}(z) * T_{t1}(z) \tag{1}$$

The small defect $T_{sd1,1}(z)$ plays the role of a Dirac delta function along the z direction. The small defect $T_{sd1,1}(z)$ can have an arbitrary shape and be vanishingly small along the z axis while being measurable with acceptable accuracy (e.g., within about 1%). In some embodiments, the small defect $T_{sd1,1}(z)$ can be obtained from memory module 1635 (FIG. 16) from a library or other database or storage system. This library or other database can be populated by measuring or simulating the responses for small defects for different pipes in multiple groups of nested pipes, and for varying permeability, thickness, and outer diameter of the those pipes. In the test configuration, once these parameters are known or have been estimated for non-defected portions of the pipes, the set of inversion results for corresponding pipes will be employed as inputs or variables in application of Equations (1)-(9) described herein.

In Equation (1), $T_{t1}(z)$ can be obtained by implementing deconvolution directly in the spatial domain. Alternatively by taking a Fourier transform (FT) of both sides of Equation (1), FT of the restored thickness variation can be obtained as:

$$\tilde{T}_{t1}(k_z) = \frac{\tilde{T}_1(k_z)}{\tilde{T}_{sd1,1}(k_z)} \tag{2}$$

where $\tilde{T}_{t1}(k_z)$, $\tilde{T}_t(k_z)$ and $\tilde{T}_{sd1,1}(k_z)$ are FTs of $T_{t1}(z)$, $T_{t1}(z)$, and $T_{sd1,1}(z)$, respectively, and $k_z$ is the Fourier variable (spatial frequency) corresponding to the z variable. The restored true thickness variation is then obtained by taking the inverse FT of $\tilde{T}_{t1}(k_z)$.

When inspecting multiple pipes (e.g., if M>1), the estimated thickness variation for pipe m ($T_m(z)$) can be written as a sum of the convolutions of estimated thickness variations on pipe m originating from all defects on each pipe. The true thickness variation on pipe m can be written as:

$$T_m(z) = T_{sd2m}(z) * T_{t1}(z) + \ldots + T_{sdm,m}(z) * T_{tm}(z) + \ldots + T_{sdM,m}(z) * T_{tM}(z) \tag{3}$$

where $T_{sdn,m}(z)$ (n=1, ... M) is the estimated thickness variation on pipe m when there is a small defect on pipe n. In an ideal case, $T_{sdn,m}(z)=0$ for n≠m, however in more realistic scenarios $T_{sdn,m}(z)$ will be non-zero due to inversion errors.

Equation (3) can be written for the estimated thickness variations for all pipes:

$$\begin{cases} T_1(z) = T_{sd1,1}(z) * T_{t1}(z) + \ldots + T_{sdm1}(z) * \\ \quad T_{tm}(z) + \ldots + T_{sdM1}(z) * T_{tM}(z) \\ \ldots \\ T_m(z) = T_{sd1,m}(z) * T_{t1}(z) + \ldots + T_{sdmn}(z) * \\ \quad T_{tm}(z) + \ldots + T_{sdMm}(z) * T_{tM}(z) \\ \ldots \\ T_M(z) = T_{sd1,M}(z) + \ldots + T_{sdnM}(z) * \\ \quad T_{tm}(z) + \ldots + T_{sdM,M}(z) * T_{tM}(z) \end{cases} \tag{4}$$

As with the case of inspecting a single pipe (e.g., M=1), methods in accordance with some embodiments can include constructing a system of equations the spatial (z) domain by approximating the convolution integrals in Equation (4) with discrete sums. Methods according to at least these embodiments can construct a large system of equations from which all $T_{tm}(z)$, m=1, ..., M functions at all depths (e.g., depth z) are estimated simultaneously. The solution for such systems of equations can suffer non-uniqueness because of the large number of unknowns.

In accordance with other embodiments, more accurate methods can take the FT of both sides of Equation (4) as shown below:

$$\begin{cases} \tilde{T}_1(k_z) = \tilde{T}_{sd1,1}(k_z)\tilde{T}_{t1}(k_z) + \ldots + \\ \tilde{T}_{sdm,1}(k_z)\tilde{T}_{tm}(k_z) + \ldots + \tilde{T}_{sdM,1}(k_z)\tilde{T}_{tM}(k_z) \\ \quad \ldots \\ \tilde{T}_m(k_z) = \tilde{T}_{sd1,m}(k_z)\tilde{T}_{t1}(k_z) + \ldots + \\ \tilde{T}_{sdn,m}(k_z)\tilde{T}_{tm}(k_z) + \ldots + \tilde{T}_{sdM,m}(k_z)\tilde{T}_{tM}(k_z) \\ \quad \ldots \\ T_M(k_z) = T_{sd1,M}(k_z)\tilde{T}_{t1}(k_z) + \ldots + \\ \tilde{T}_{sdn,M}(k_z)\tilde{T}_{tm}(k_z) + \ldots + \tilde{T}_{sdM,M}(k_z)\tilde{T}_{tM}(k_z) \end{cases} \quad (5)$$

Equation (5) can be written in matrix form:

$$\begin{bmatrix} \tilde{T}_1(k_z) \\ \vdots \\ \tilde{T}_M(k_z) \end{bmatrix} = \begin{bmatrix} \tilde{T}_{sd1,1}(k_z) & \ldots & \tilde{T}_{sdM,1}(k_z) \\ \vdots & & \vdots \\ \tilde{T}_{sd1,M}(k_z) & \ldots & \tilde{T}_{sdM,M}(k_z) \end{bmatrix} \begin{bmatrix} \tilde{T}_{t1}(k_z) \\ \vdots \\ \tilde{T}_{tM}(k_z) \end{bmatrix} \quad (6)$$

Methods in accordance with various embodiments can construct the system of equations of Equations (5) and (6) for each $k_z$ and methods can solve these systems of equations to obtain the FT of restored true thickness variations $\tilde{T}_{tm}(k_z)$ (m=1, ..., M). Once these functions are obtained at all $k_z$, inverse FT is applied to obtain the restored true thickness variations $T_{tm}(z)$ (m=1, ..., M).

Once the true thickness variations $T_{tm}(z)$ are restored, methods in accordance with various embodiments can be applied to adjust the values of the restored thickness. Embodiments perform these adjustments because the $T_{sd1,m}$ functions are responses due to small defects that are employed to approximate the responses to an impulse (ideal Dirac delta distributions), in other words, the defects have infinite size at one position and are zero everywhere else. Although the $T_{sd1,m}$ functions do allow for improvements in accuracy as will be illustrated in later figures herein, the actual magnitude of $T_{sd1,m}$ will depend on size and shape of $T_{sd1,m}$ chosen from the library described earlier herein, as well as the properties and dimensions of the pipes measured.

According to various embodiments, a method for adjusting the values of restored thickness can include normalizing $T_{tm}(z)$ functions to match the maximum value of the $T_{tm}(z)$ functions to the maximum value of actual thickness ($T_m(z)$) functions. Then, to perform adjustments, methods in accordance with various embodiments set the energy of the $T_{tm}(z)$ functions equal to the energy of $T_m(z)$ by applying (e.g., multiplying) proper coefficients $c_m$ to the $T_{tm}(z)$ functions:

$$c_m \int_z T_{tm}^2(z)dz = \int_z T_m^2(z)dz \quad (7)$$

In another embodiment, methods can apply a window centered at each point along the z axis (e.g., each depth) on both $T_{tm}(z)$ and $T_m(z)$ functions and then the integral over z can be matched for both window functions by applying proper $c_m(z)$ according to:

$$c_m(z) = \int_\tau (G_1(\tau-z)T_{tm}(\tau))^2 d\tau = \int_\tau (G_2(\tau-z)T_m(\tau))^2 d\tau \quad (8)$$

where $G_1(z)$ and $G_2(z)$ are properly chosen windows such as Gaussian windows, rectangular windows, etc. The coefficients $c_m(z)$ can then be applied to $T_{tm}(z)$ to obtain adjusted $T_{tm}(z)$ functions. In some embodiments, more than one defect may be present and example methods can include determining depth ranges within the wellbore for which defects are present in at least one pipe of the multiple nested conductive pipes. These methods can include determining a value for the coefficient $c_m(z)$ at each of the depth ranges, and adjusting thickness variations at each of the depth ranges by the value for the corresponding $c_m(z)$ at the corresponding depth range.

By applying the proposed adjustment processes described above, distinct peaks generated by the defects can be recognized in the adjusted $T_{tm}(z)$ functions. Further adjustment of the level of these peaks can be applied to generate thickness values at the peaks that are as close as possible (e.g., within a range of 1-5%) to the true thickness values. In one embodiment, this further adjustment can be implemented according to Equation (9) by applying coefficients $d_m$ on the adjusted $T_{tm}(z)$ functions to match the energy for windowed $T_{tm}(z)$ functions (such that the windowed function contains the main detected peak that was generated by the defect) with the energy for windowed $T_m(z)$ functions (such that the windowed function contains the double peaks generated by the ghost effect):

$$d_m \int_z (G_1(z)T_{tm}(z))^2 dz = \int_z (G_2(z)T_m(z))^2 dz \quad (9)$$

In other embodiments, a factor can be employed to further adjust the values of the $T_{tm}(z)$ functions. This factor can be a number (e.g., an integer, although embodiments are not limited thereto) that causes the magnitude of the main peak of the $T_{tm}(z)$ function to equal two times (or close to two, or some other factor) larger than the magnitude of the double peaks observed in $T_m(z)$ due to the ghost effect.

The adjustment approaches described above can be tested for any given set of pipes to help ensure accurate results, or any adjustment factors, etc., can be stored in a memory (e.g., in a library) that contains adjustment factors produced for similar pre-known configurations. Interpolation or extrapolation, or both, can be used to obtain adjustment factors for test configurations not directly available in the library.

Figure 7:
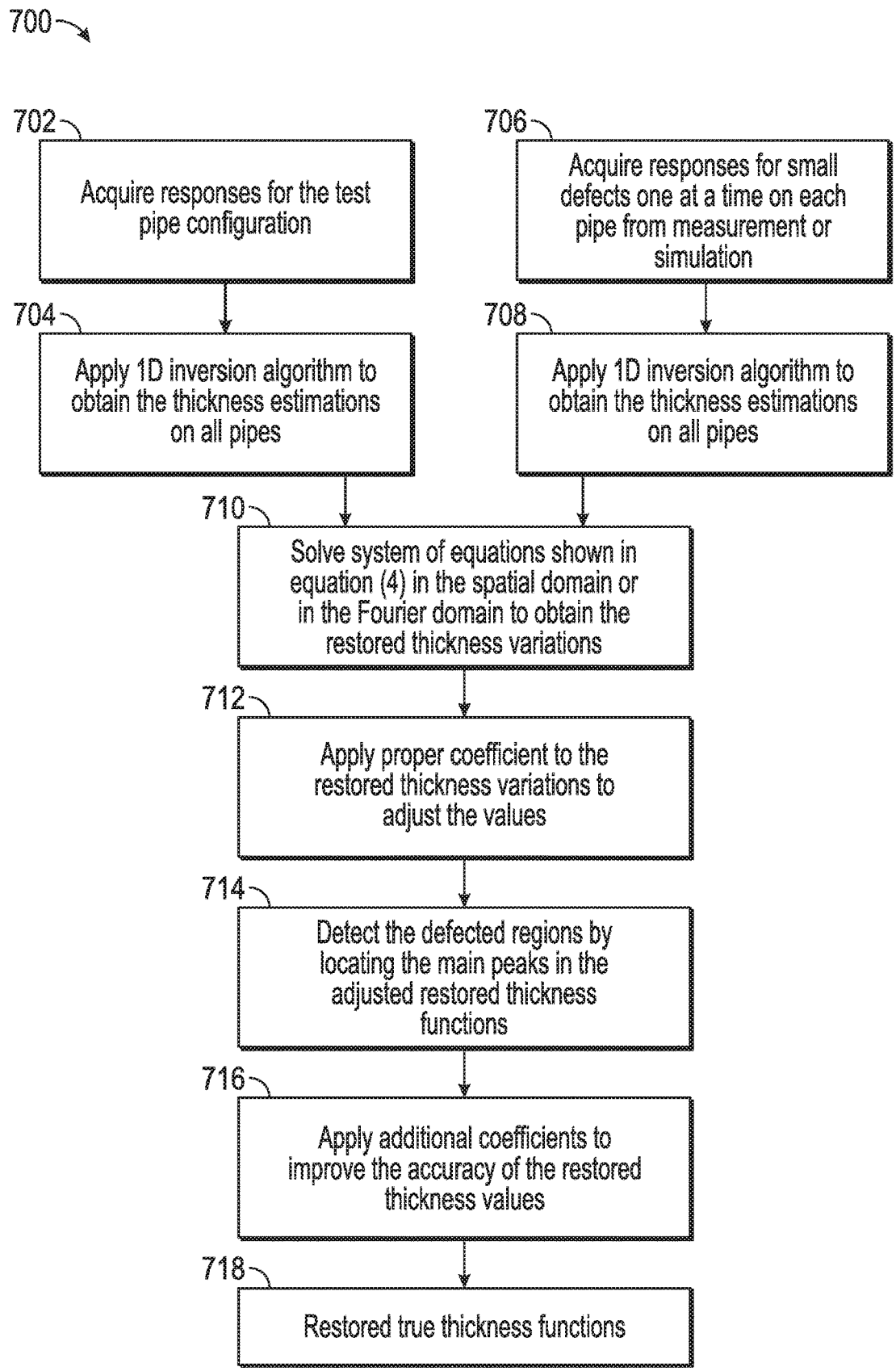
FIG. 7 is a flowchart illustrating an example method for restoration of true thickness values applied on the results of 1D inversion algorithms in accordance with various embodiments.

FIG. 7 is a flowchart illustrating an example method 700 for restoration of true thickness values applied on the results of 1D inversion algorithms in accordance with various embodiments. At least some operations of the example method 700 can be executed by components of the logging facility 116 (FIG. 1) or of the system 1600 (e.g., control circuitry 1630).

The example method 700 begins with operation 702 with the control circuitry 1630 acquiring responses for a test pipe configuration. For example, electromagnetic logging tool 108 (FIG. 1) or tool 300 (FIG. 3) can be inserted within one or more pipes in a test pipe configuration to obtain responses to primary fields generated by a transmitter coil 118 (FIG. 1). The example method 700 continues with operation 704 by applying a 1D inversion algorithm to obtain the thickness estimation on all pipes in the test pipe configuration to generate $T_1(z)$ to $T_M(z)$ as described earlier herein.

The example method 700 continues with operation 706 with the control circuitry 1630 acquiring responses for small defects one at a time on each pipe (e.g., $T_{sdn,m}(z)$ as described above with respect to Equation (1)) from measurement or simulation and, in operation 708, applying a 1D inversion algorithm to obtain the thickness estimations on all pipes. The acquired responses of operation 706 may be for synthetic defects measured in a simulation or the acquired responses of operation 706 may be generated with experimental measurements of small defects in pipes.

The example method 700 continues with operation 710 with the control circuitry 1630 solving equations, for example Equation (4), in the spatial domain or the Fourier domain (Equation (5)) to obtain restored thickness variations. The example method 700 continues with operation 712 with the control circuitry 1630 applying coefficients as described above with respect to Equations (7) and (8) to adjust values of the restored thickness variations.

The example method 700 continues with operation 714 with control circuitry 1630 detecting the defected regions by locating the main peaks in the adjusted restored thickness functions. The example method 700 continues with operation 716 with the control circuitry 1630 applying additional coefficients at least somewhat similarly to the algorithm described above with reference to Equation (9) to improve accuracy of restored thickness values. The output of example method 700 are restored true thickness functions in operation 718.

Figure 8A:
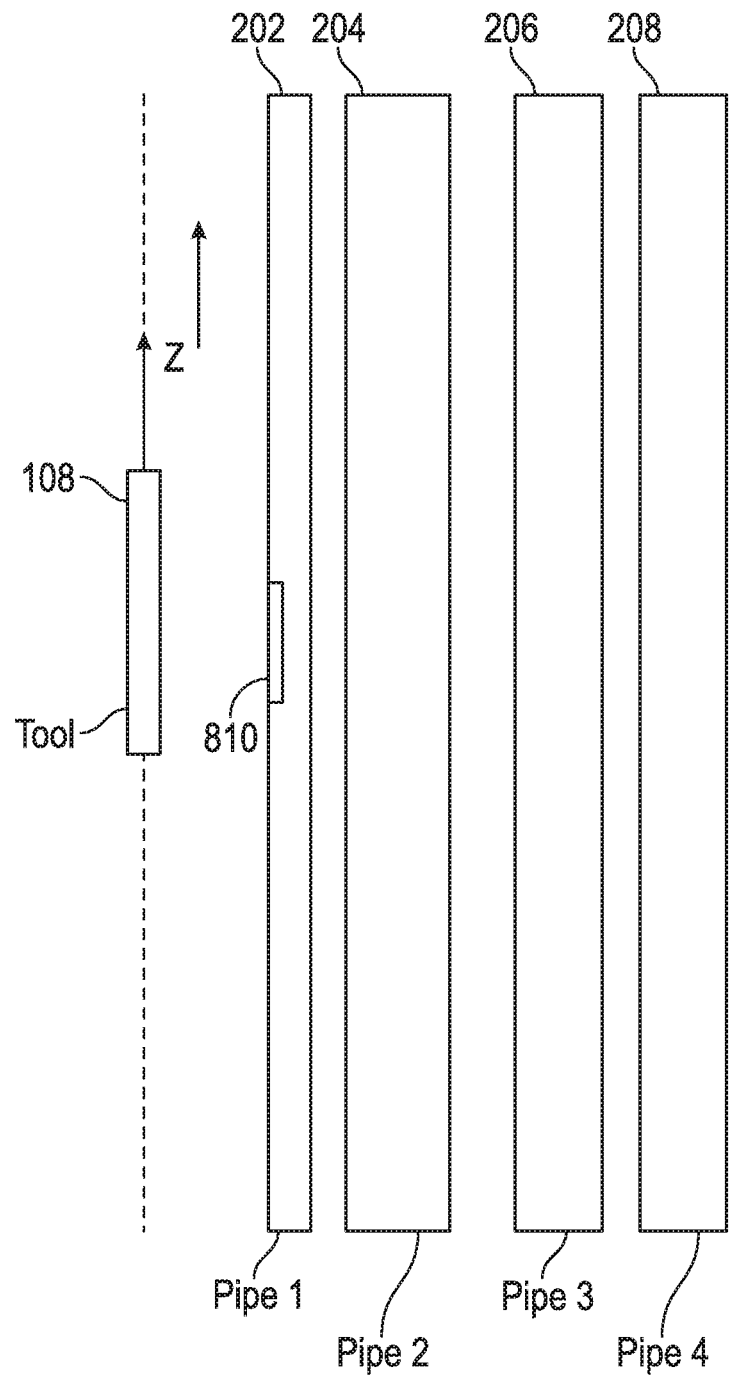
FIGS. 8A-8C illustrate inversion results for a small defect on a first pipe of a four pipe configuration, in accordance with various embodiments.
Figure 8B:
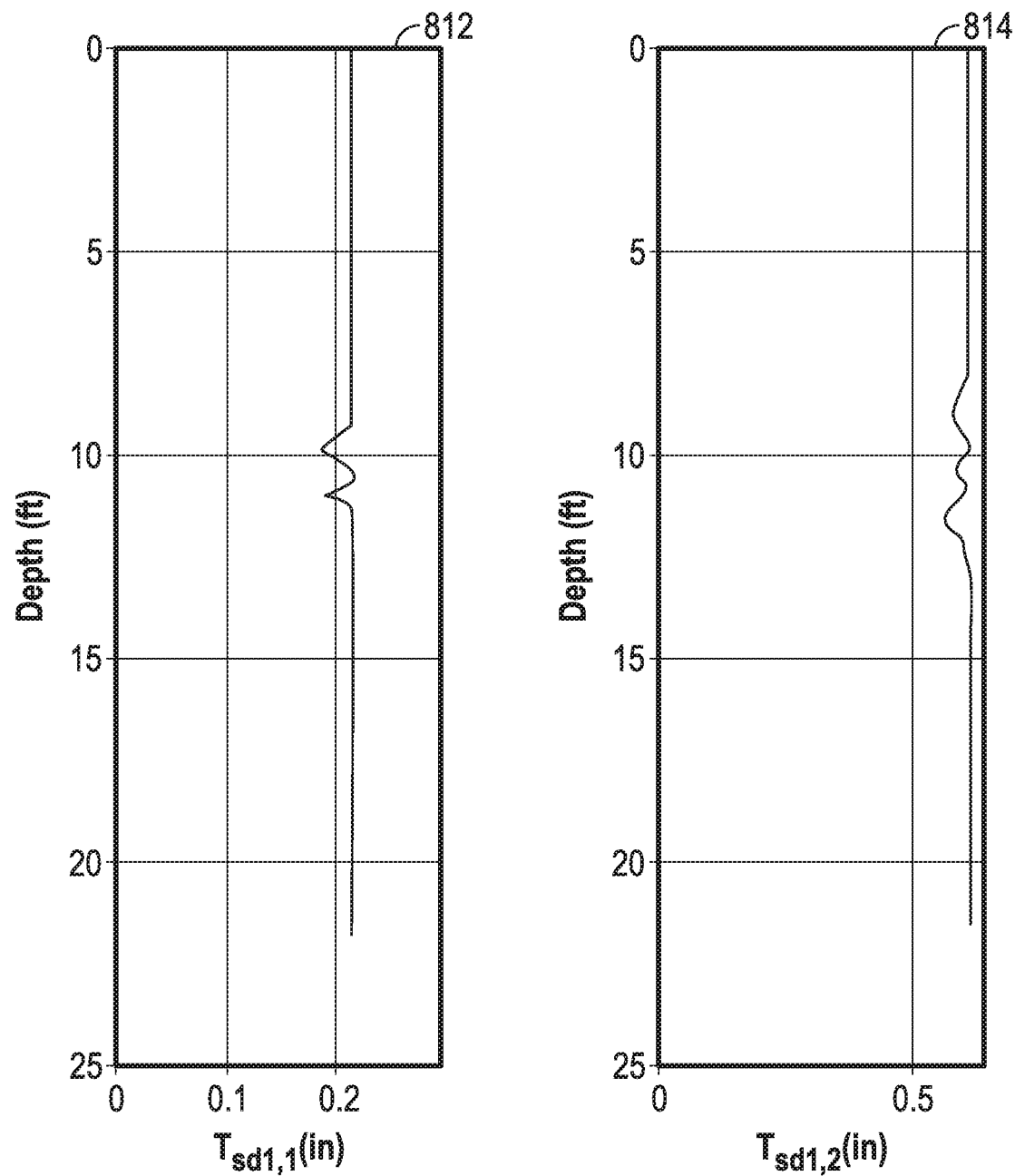
Figure 8C:
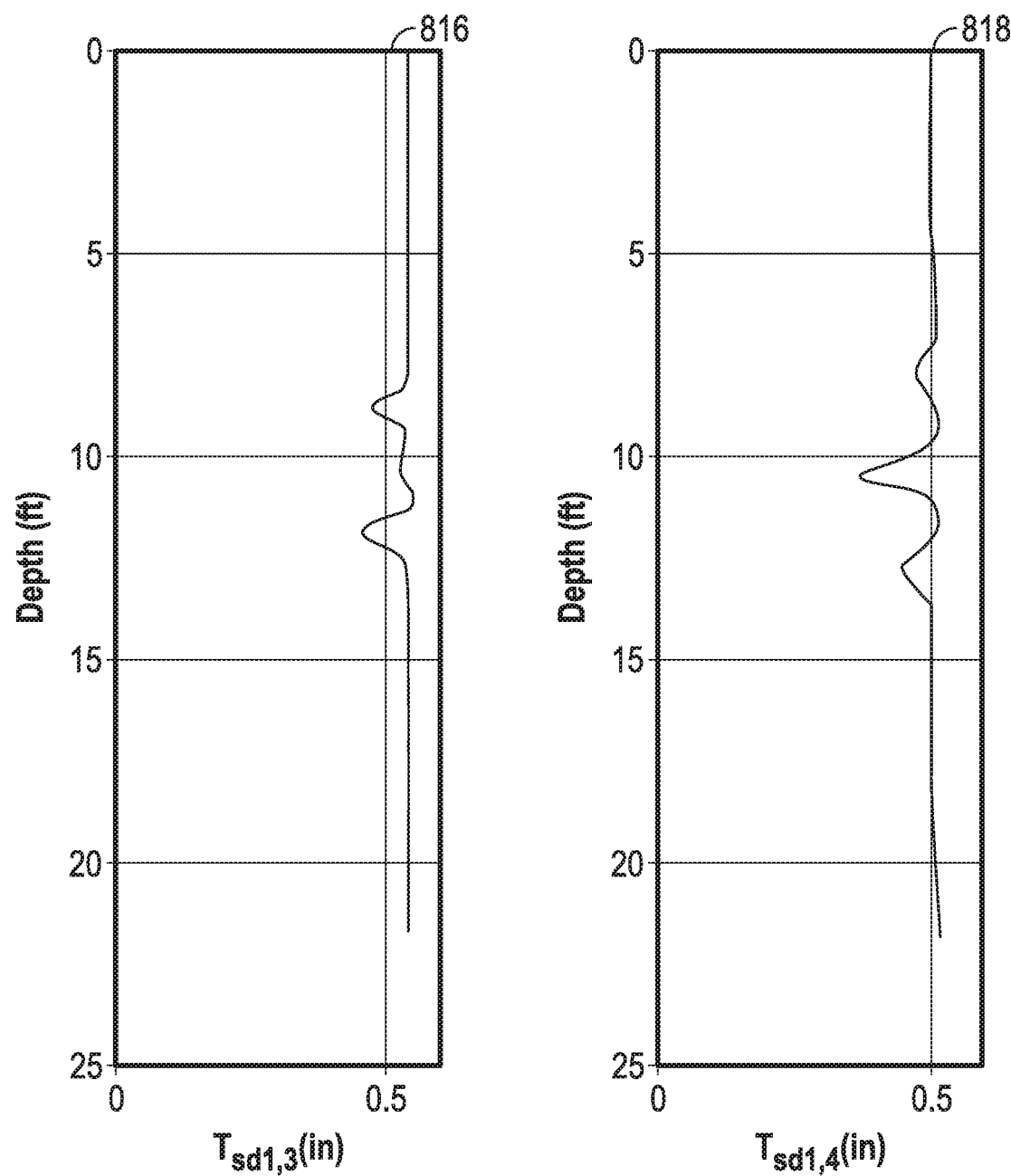

FIGS. 8A-8C illustrate inversion results for a small defect on a first pipe of a four pipe configuration, in accordance with various embodiments. FIG. 8A shows a defect 810 on pipe 202 of a four-pipe configuration consisting of pipe 202, pipe 204, pipe 206 and pipe 208. FIGS. 8B and 8C show inversion results for a small defect 810 on pipe 202 when the responses for the defect 810 are logged at the same frequencies and the same logged depth as a test configuration (wherein the test configuration can be at least somewhat similar to that described above with respect to operation 702). FIG. 8B shows the estimated thickness on pipes 202 (left plot 812) and 204 (right plot 814) (e.g., $T_{sd1,1}(z)$, as described above with reference to Equation (1)). $T_{sd1,1}(z)$ is the estimated thickness on pipe 202 originating from the small defect on pipe 202 and $T_{sd1,2}(z)$ is the estimated thickness on pipe 204 originating from the small defect on pipe 202. FIG. 8C shows the estimated thickness on pipes 206 (left plot 816) and 208 (right plot 818) (e.g., $T_{sd1,3}(z)$ is the estimated thickness on pipe 206 originating from the small defect on pipe 202 and $T_{sd1,4}(z)$ is the estimated thickness on pipe 208 originating from the small defect on pipe 202).

Figure 9A:
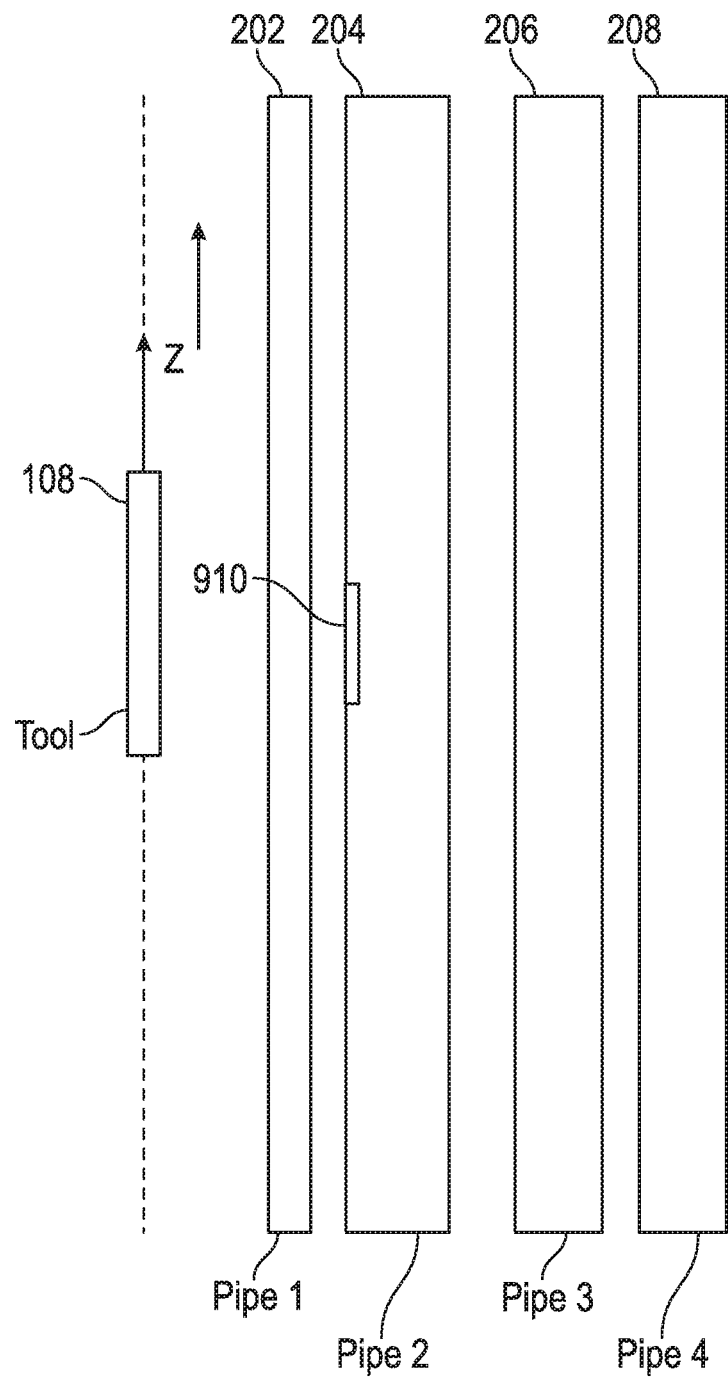
FIGS. 9A-9C illustrate inversion results for a small defect on a second pipe of a four pipe configuration, in accordance with various embodiments.
Figure 9B:
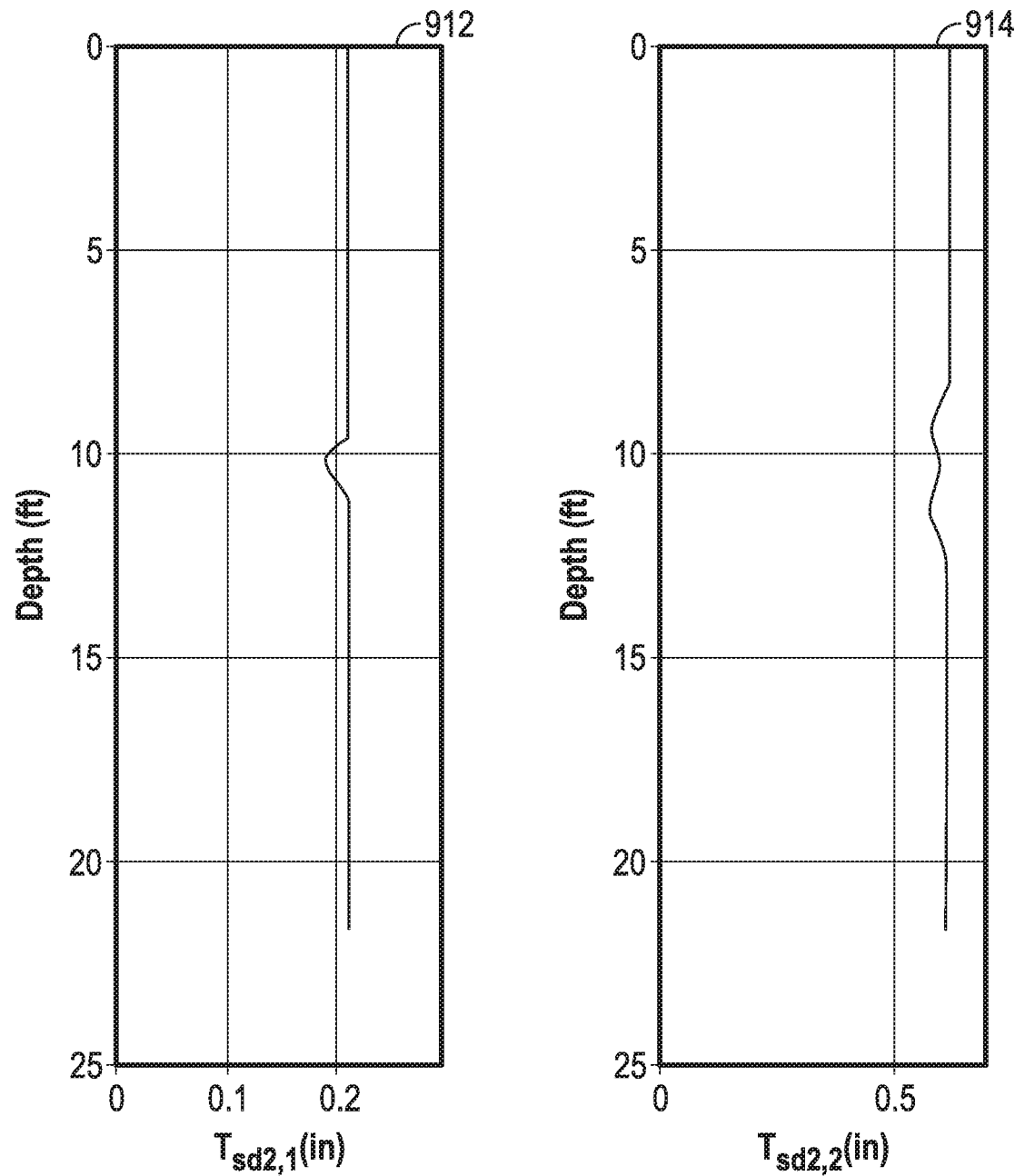
Figure 9C:
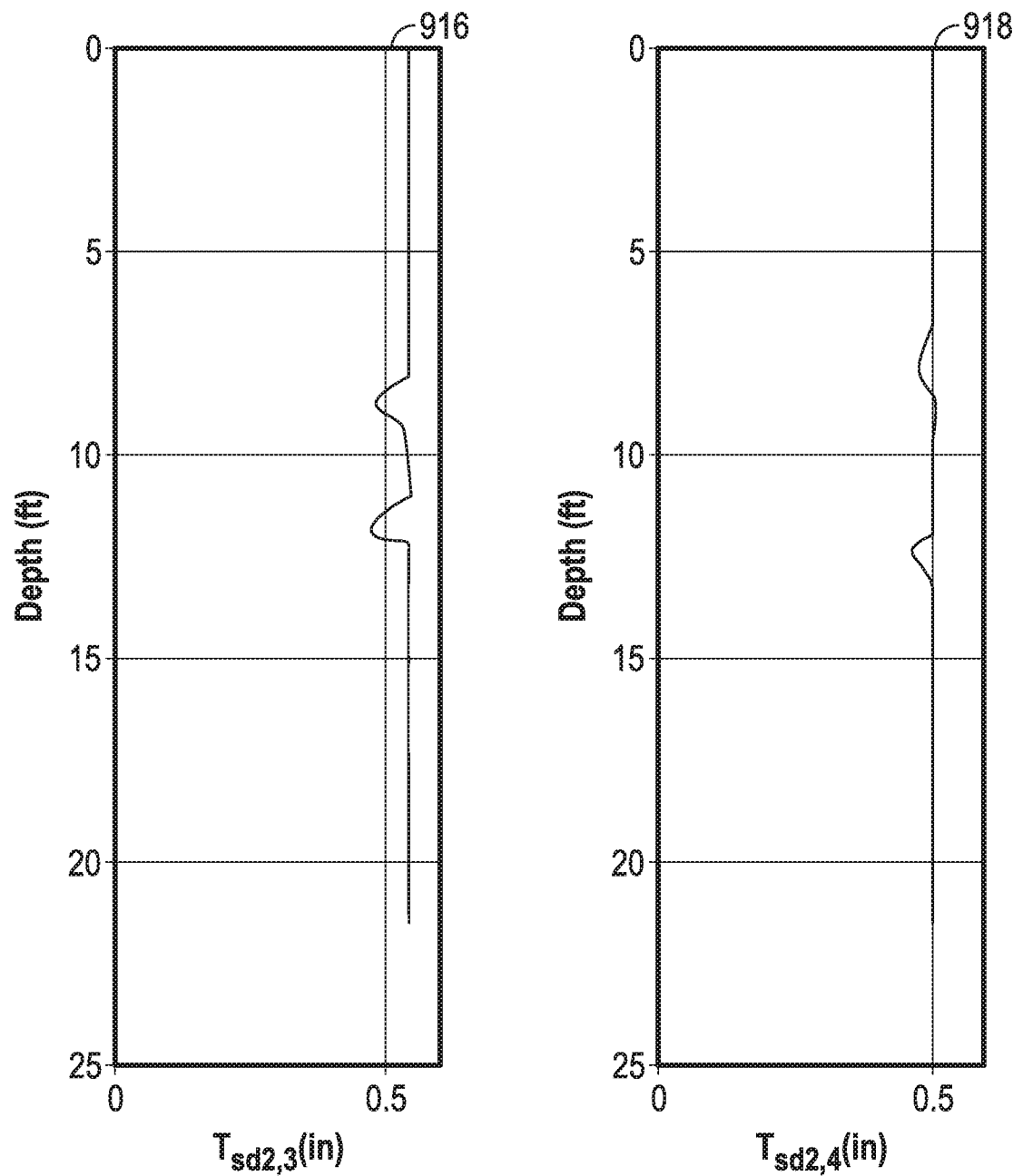

FIGS. 9A-9C illustrate inversion results for a small defect on a second pipe of a four pipe configuration, in accordance with various embodiments. FIG. 9A shows a defect 910 on pipe 204 of a four-pipe configuration consisting of pipe 202, pipe 204, pipe 206 and pipe 208. FIGS. 9B and 9C show inversion results for the defect 910 when the responses for the defect 910 are logged at the same frequencies and the same logged depth as the same test configuration as that described above with respect to FIGS. 8A-8C. FIG. 9B shows the estimated thickness $T_{sd2,1}(z)$ on pipe 202 (left plot 912) originating from a small defect on pipe 204 and the estimated thickness $T_{sd2,2}(z)$ on pipe 204 (right plot 914) originating from a small defect on pipe 204. FIG. 9C shows the estimated thickness $T_{sd2,3}(z)$ on pipe 206 (left plot 916) originating from a small defect on pipe 204 and the estimated thickness $T_{sd2,4}(z)$ on pipe 208 (right plot 918) originating from a small defect on pipe 204.

Figure 10A:
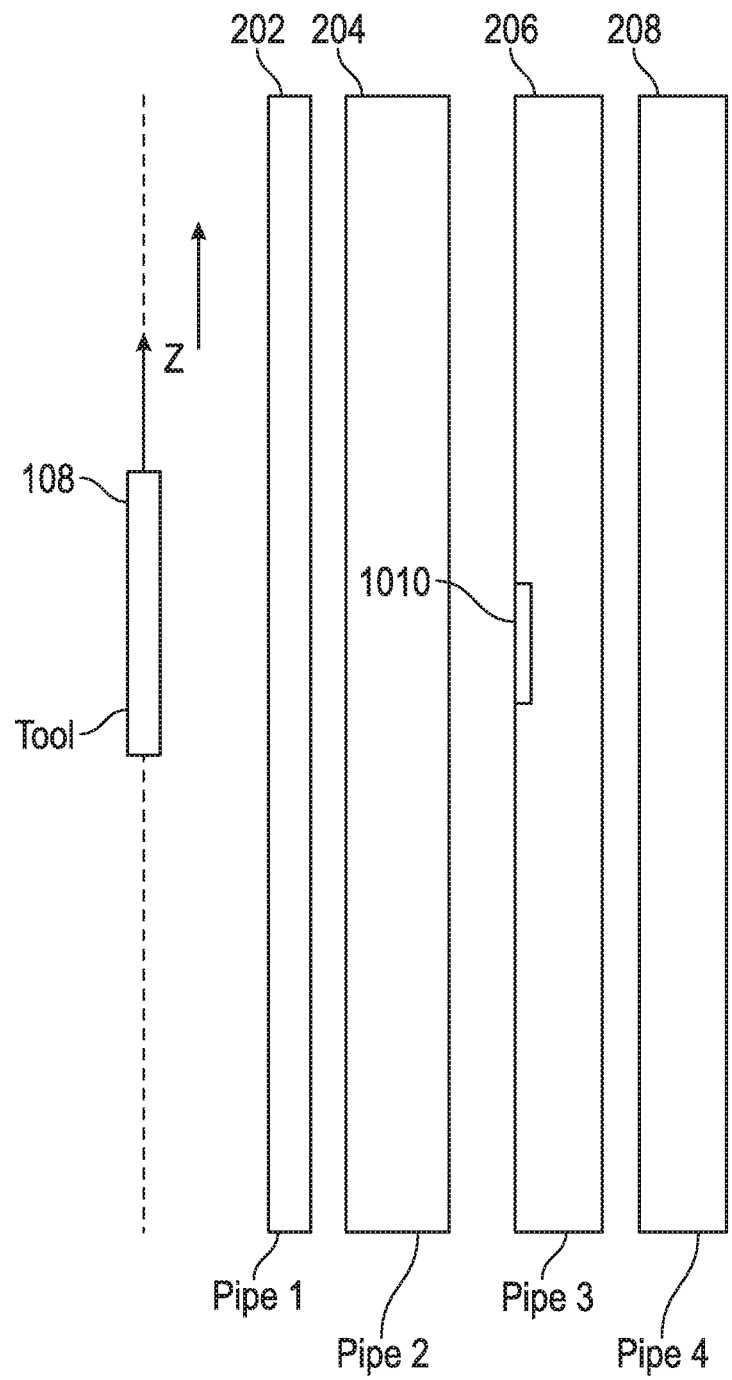
FIGS. 10A-10C illustrate inversion results for a small defect on a third pipe of a four pipe configuration, in accordance with various embodiments.
Figure 10B:
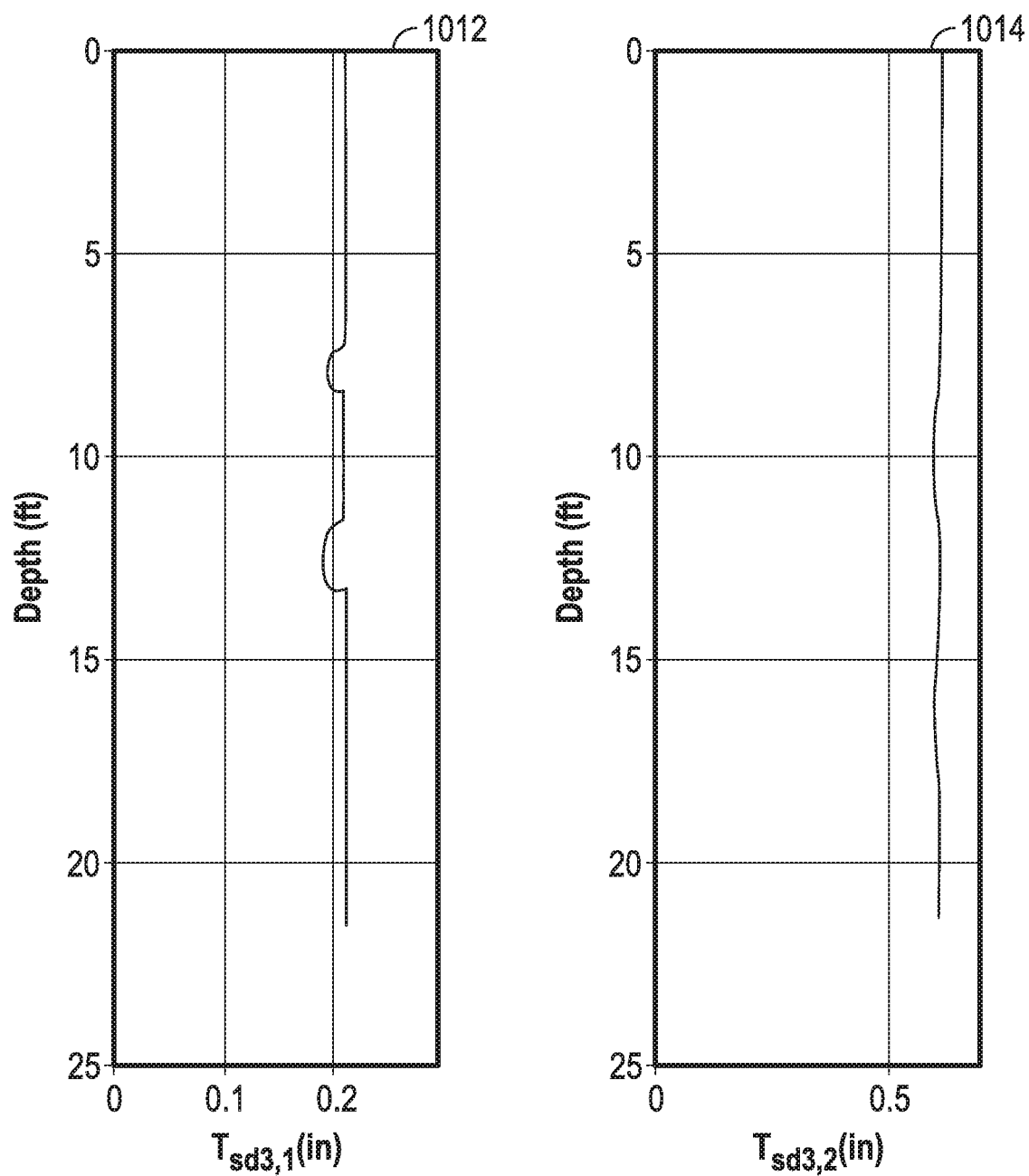
Figure 10C:
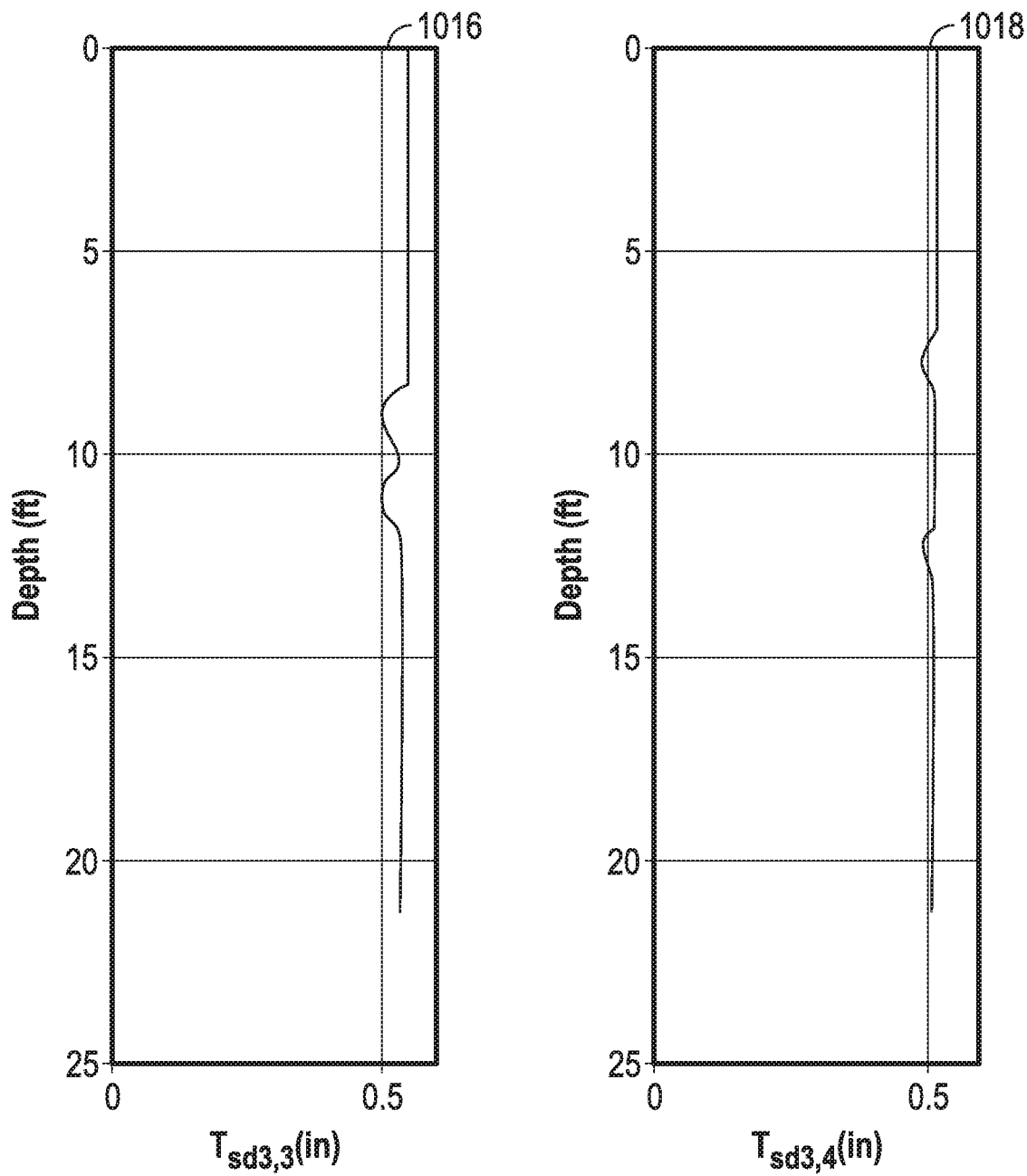

FIGS. 10A-10C illustrate inversion results for a small defect on a third pipe of a four pipe configuration, in accordance with various embodiments. FIG. 10A shows a defect 1010 on pipe 206 of a four-pipe configuration consisting of pipe 202, pipe 204, pipe 206 and pipe 208. FIGS. 10B and 10C show inversion results for the defect 1010 when the responses for the defect 1010 are logged at the same frequencies and the same logged depth as the same test configuration as that described above with respect to FIGS. 8A-8C. FIG. 10B shows the estimated thickness $T_{sd3,1}(z)$ on pipe 202 (left plot 1012) originating from a small defect on pipe 206 and the estimated thickness $T_{sd3,2}(z)$ on pipe 204 (right plot 1014) originating from a small defect on pipe 206. FIG. 10C shows the estimated thickness $T_{sd3,3}(z)$ on pipe 206 (left plot 1016) originating from a small defect on pipe 206 and the estimated thickness $T_{sd3,4}(z)$ on pipe 208 (right plot 1018) originating from a small defect on pipe 206.

Figure 11A:
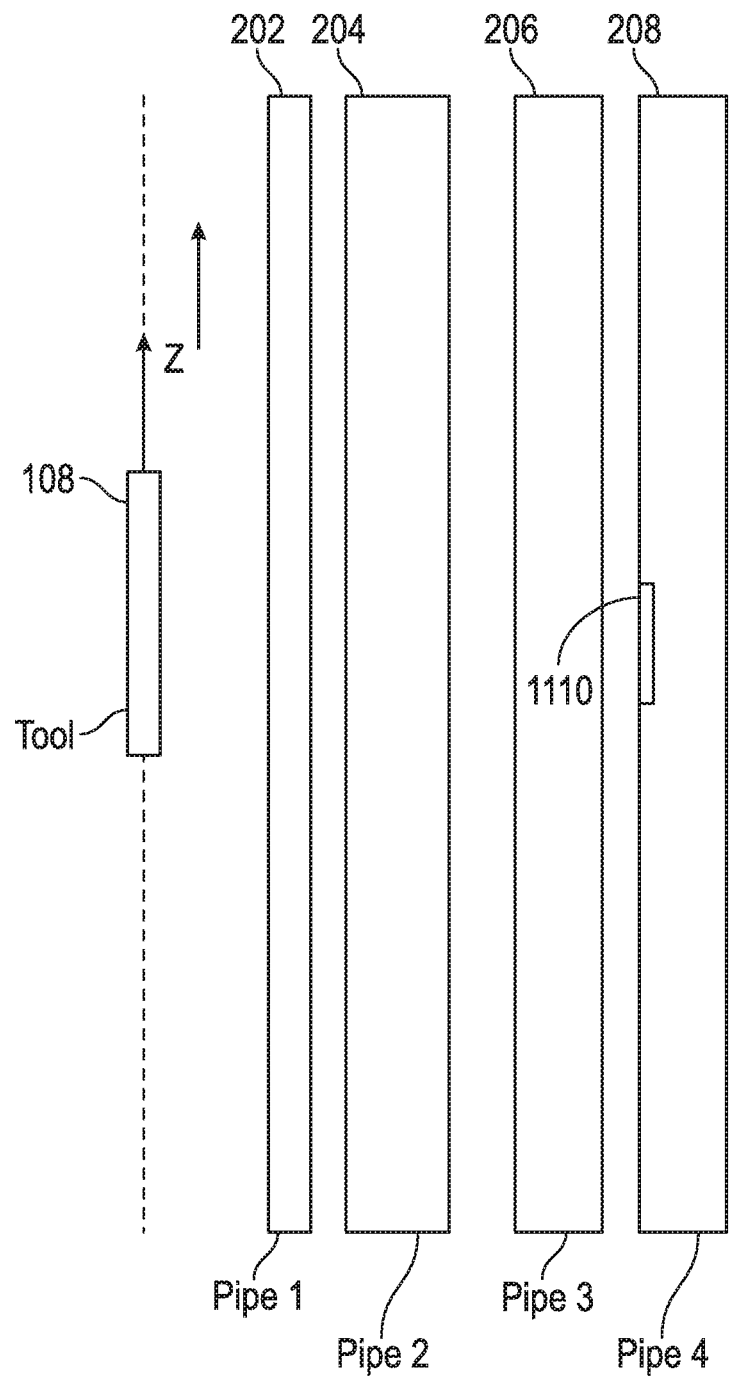
FIGS. 11A-11C illustrate inversion results for a small defect on a fourth pipe of a four pipe configuration, in accordance with various embodiments.
Figure 11B:
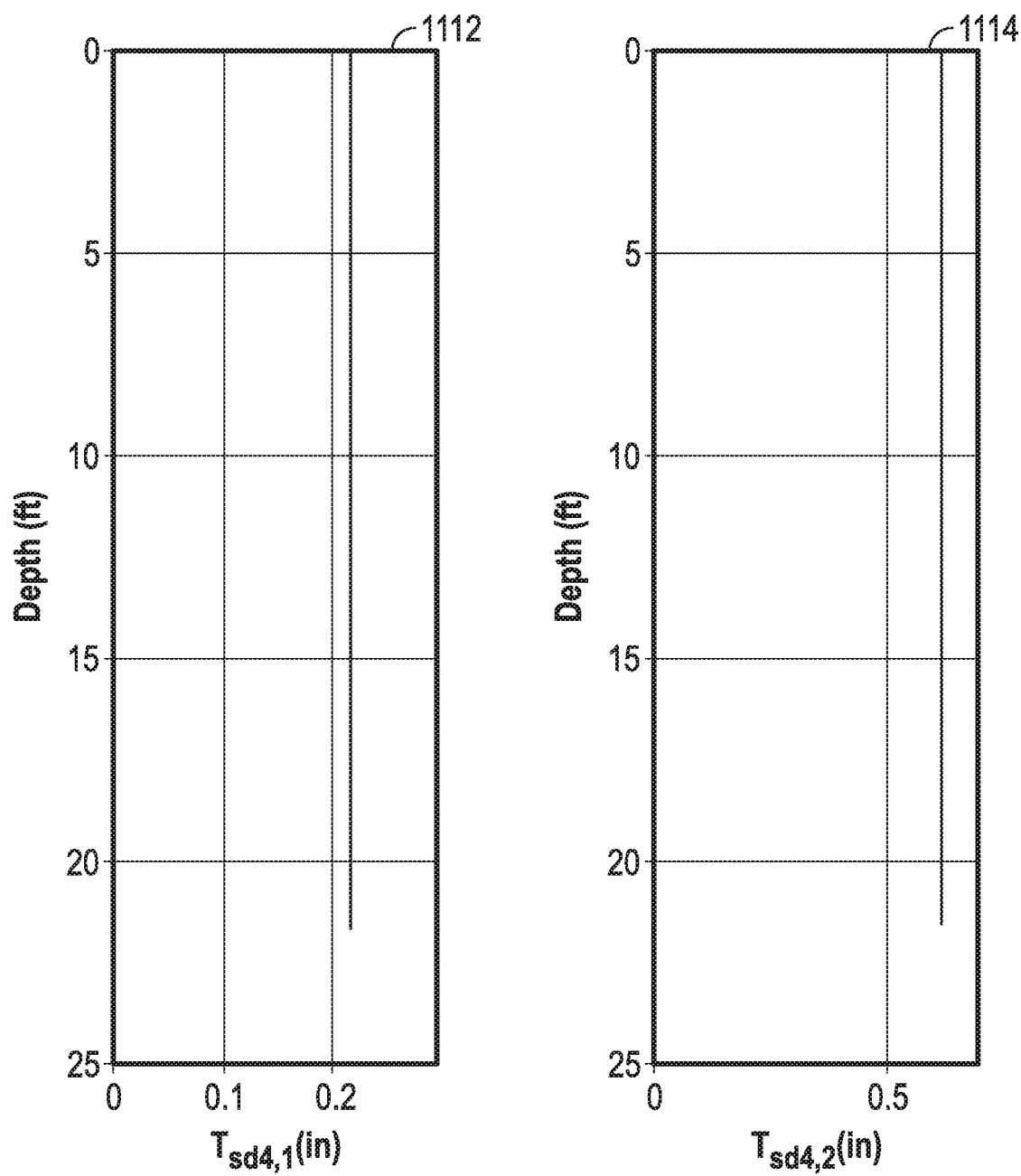
Figure 11C:
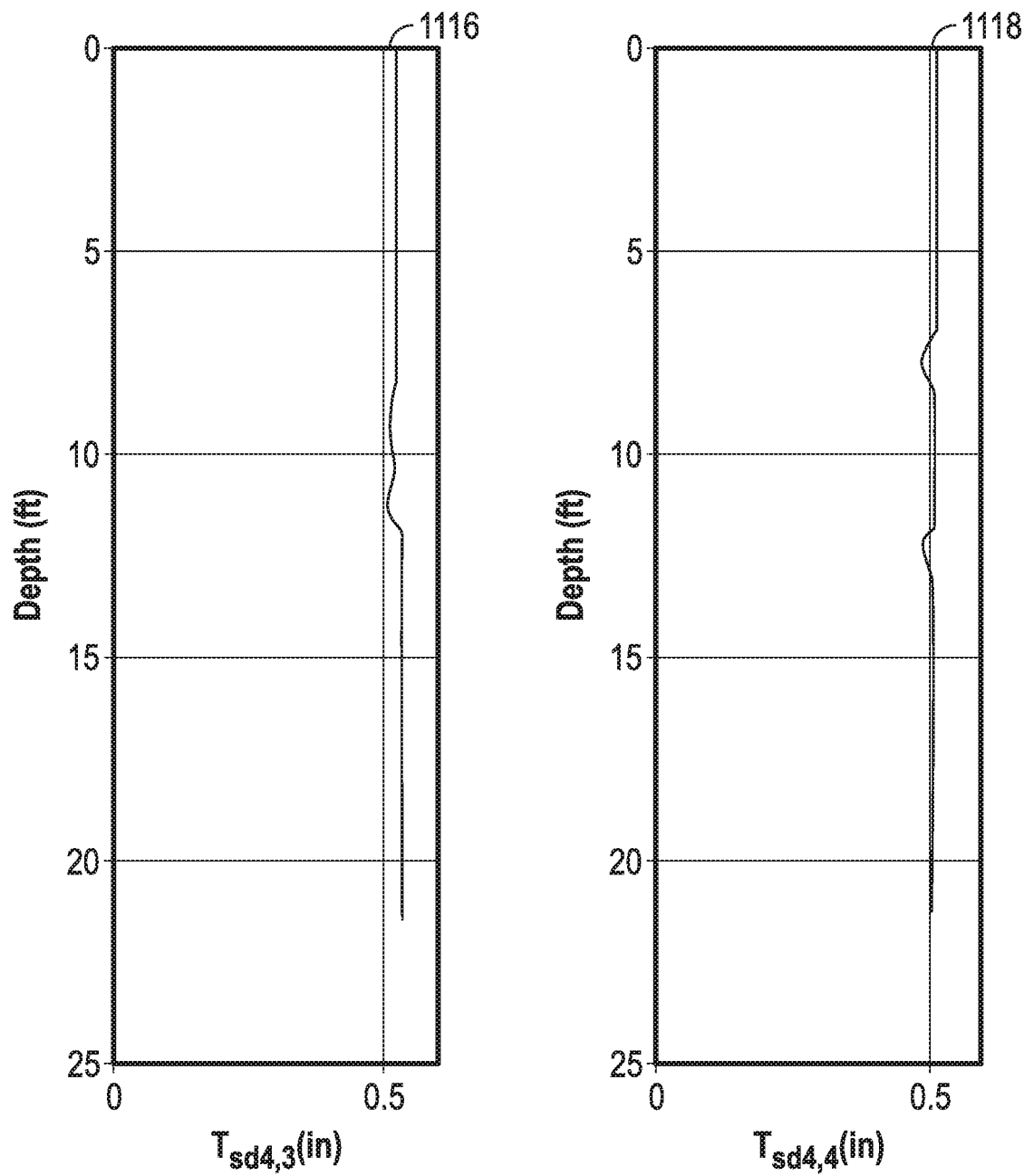

FIGS. 11A-11C illustrate inversion results for a small defect on a fourth pipe of a four pipe configuration, in accordance with various embodiments. FIG. 11A shows a defect 1110 on pipe 208 of a four-pipe configuration consisting of pipe 202, pipe 204, pipe 206 and pipe 208. FIGS. 11B and 11C show inversion results for the defect 1110 when the responses for the defect 1110 are logged at the same frequencies and the same logged depth as the same test configuration as that described above with respect to FIGS. 8A-8C. FIG. 11B shows the estimated thickness $T_{sd4,1}(z)$ on pipe 202 (left plot 1112) originating from a small defect on pipe 208 and the estimated thickness $T_{sd4,2}(z)$ on pipe 204 originating from a small defect on pipe 208 (right plot 1114). FIG. 11C shows the estimated thickness $T_{sd4,3}(z)$ on pipe 206 (left plot 1116) originating from a small defect on pipe 208 and the estimated thickness $T_{sd4,4}(z)$ on pipe 208 (right plot 1118) originating from a small defect on pipe 208.

Figure 12A:
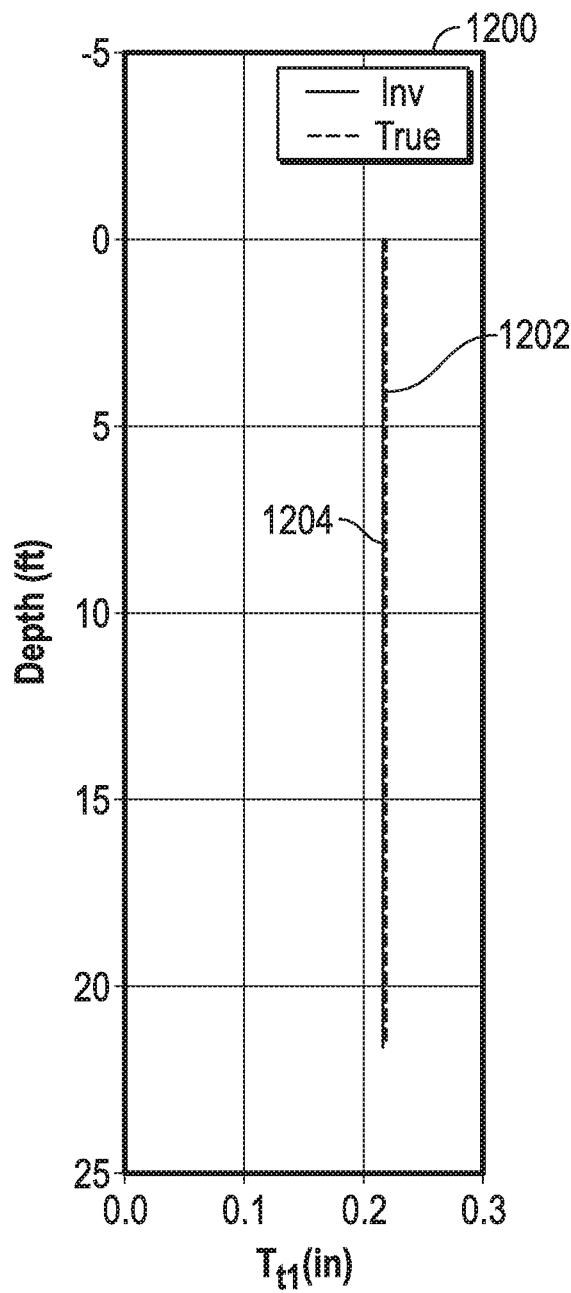
FIGS. 12A-12D illustrates comparison of thickness values obtained from the inversion with true thickness values for a defect on a fourth pipe of a four-pipe configuration in accordance with various embodiments.
Figure 12B:
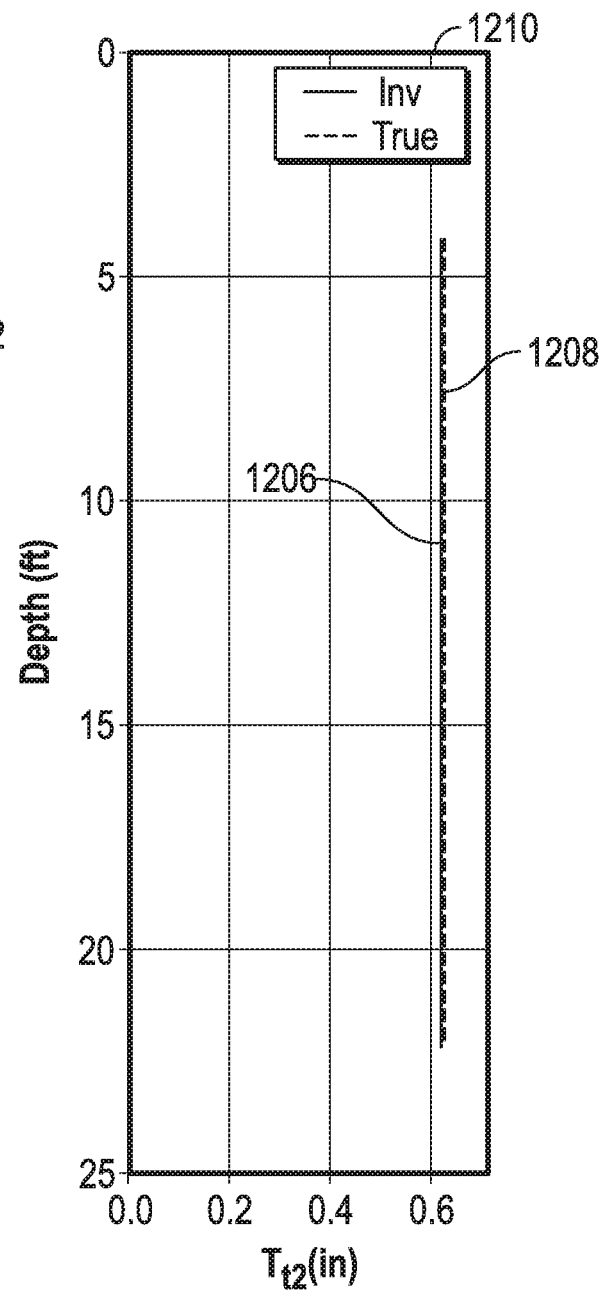
Figure 12C:
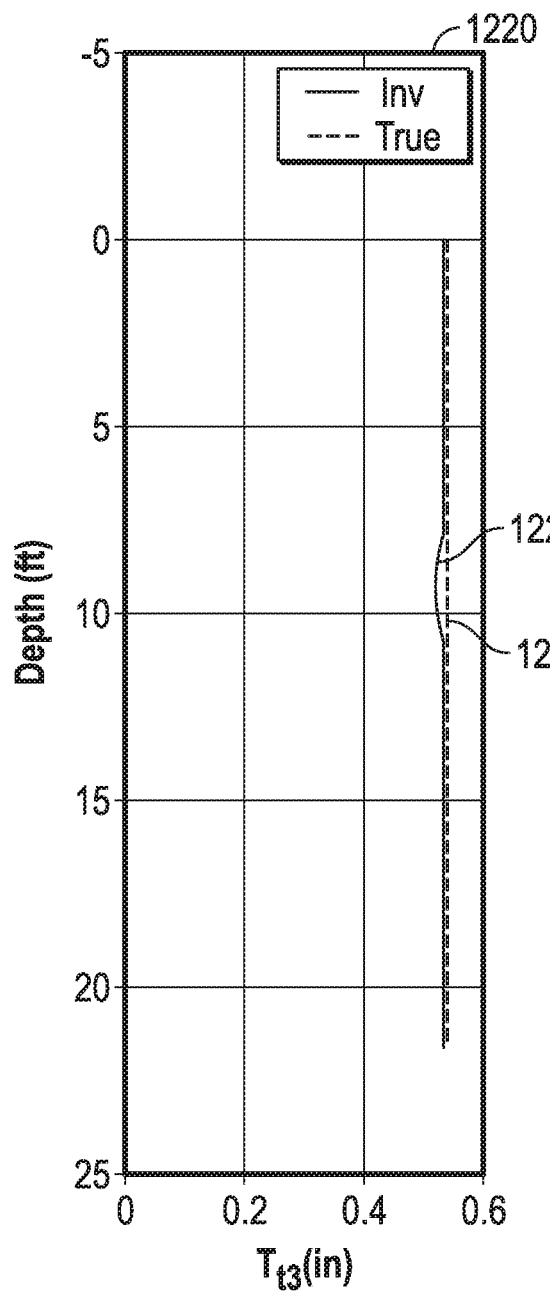
Figure 12D:
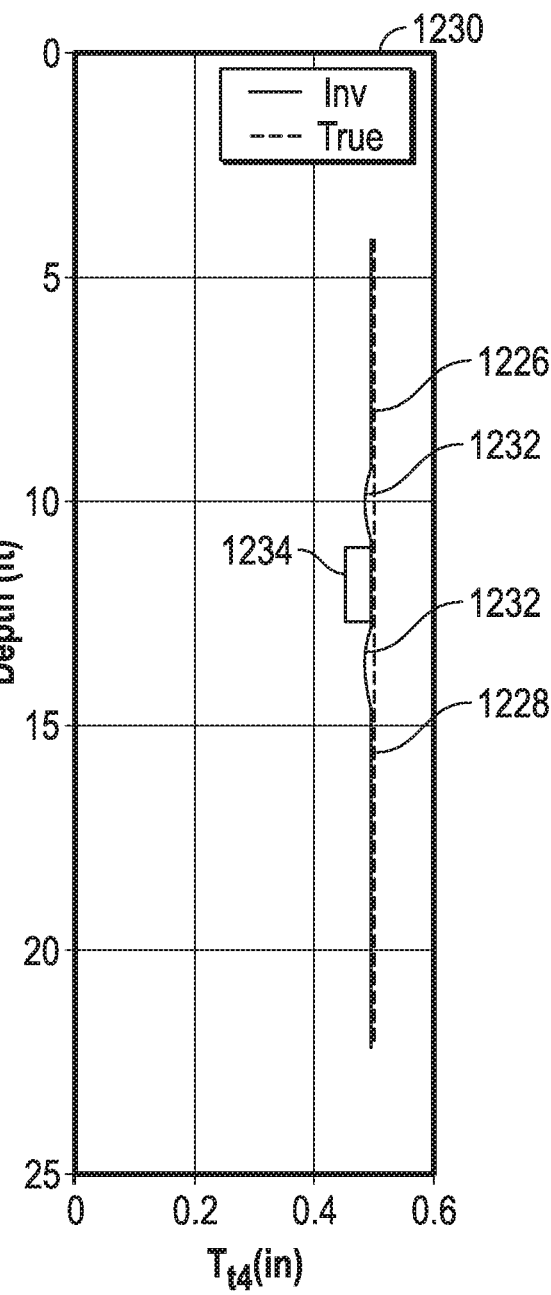

FIGS. 12A through 12D illustrates comparison of thickness values obtained from the inversion with true thickness values of four pipes of a multi-pipe configuration, when a defect is found on a fourth pipe of the four-pipe configuration, in accordance with various embodiments. The values obtained from the inversion are also shown in FIGS. 11B and 11C and are shown in FIGS. 12A, 12B, 12C, and 12D as lines 1204, 1206, 1224 and 1228 for ease of comparison. FIG. 12A shows the true thickness variation 1202 (or $T_{t1}(z)$ as described with respect to Equation 1) of pipe 202 compared to inversion results 1204 for pipe 202. FIG. 12B shows the true thickness variation 1208 (or $T_{t2}(z)$) of pipe 204, compared to inversion results 1206 for pipe 204. FIG. 12C shows the true thickness variation 1222 (or $T_{t3}(z)$) of pipe 206 compared to inversion results 1224 for pipe 206. FIG. 12D shows the true thickness variation 1226 (or $T_{t4}(z)$) of pipe 208, compared to inversion results 1228 for pipe 208. From observing FIG. 12B, it will be appreciated that there is a large spurious variation on pipe 206 and ghost effects are observed on pipe 208. Thickness restoration algorithms described above with reference to Equations (1)-(9) can improve final thickness estimations. By applying the restoration algorithm and adjust process of Equation (7), it is observed that the double peaks 1232 on pipe 208 are reduced to only one main peak 1234 caused by the presence of the defect 1110 on pipe 208.

The inversions results for the small defects on pipes 202, 204, 206 and 208, as well as the inversion results for the test configuration are inputs to the thickness restoration algorithm described above. In embodiments using an FT approach, after taking the FT of the inversion results, the system of equations in equation (6) is solved to obtain the FT of the restored thickness variations on the pipes. Then, proper Gaussian filters are applies to the solutions in the Fourier domain to reduce the effect of spurious high frequency components. Finally, inverse FT is applied to the solutions to obtain the spatial variations of the restored thickness estimation on each pipe.

Figure 13A:
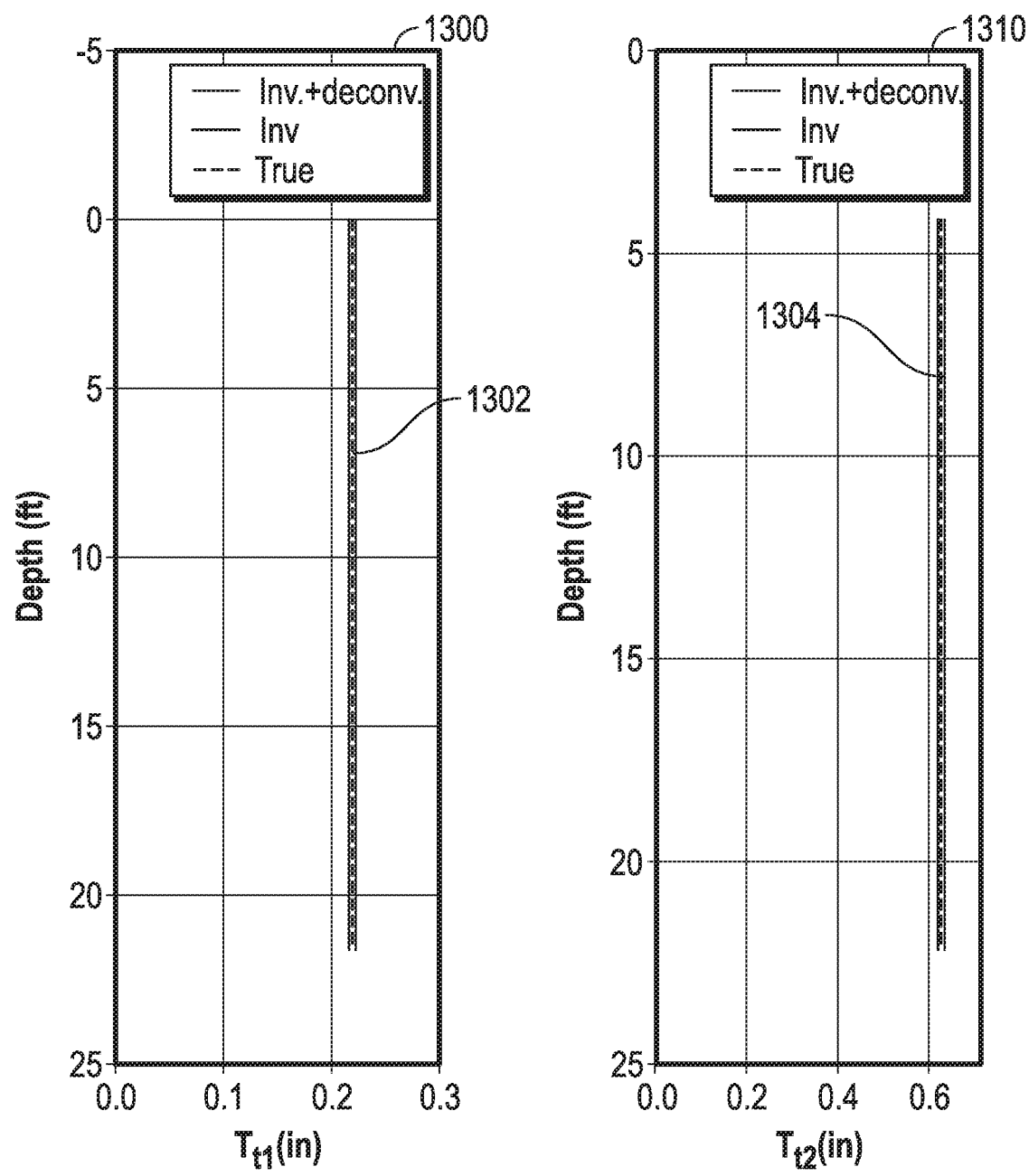
FIGS. 13A-13B illustrate one adjustment after applying algorithms of Equations (7) and (9) in accordance with various embodiments.
Figure 13B:
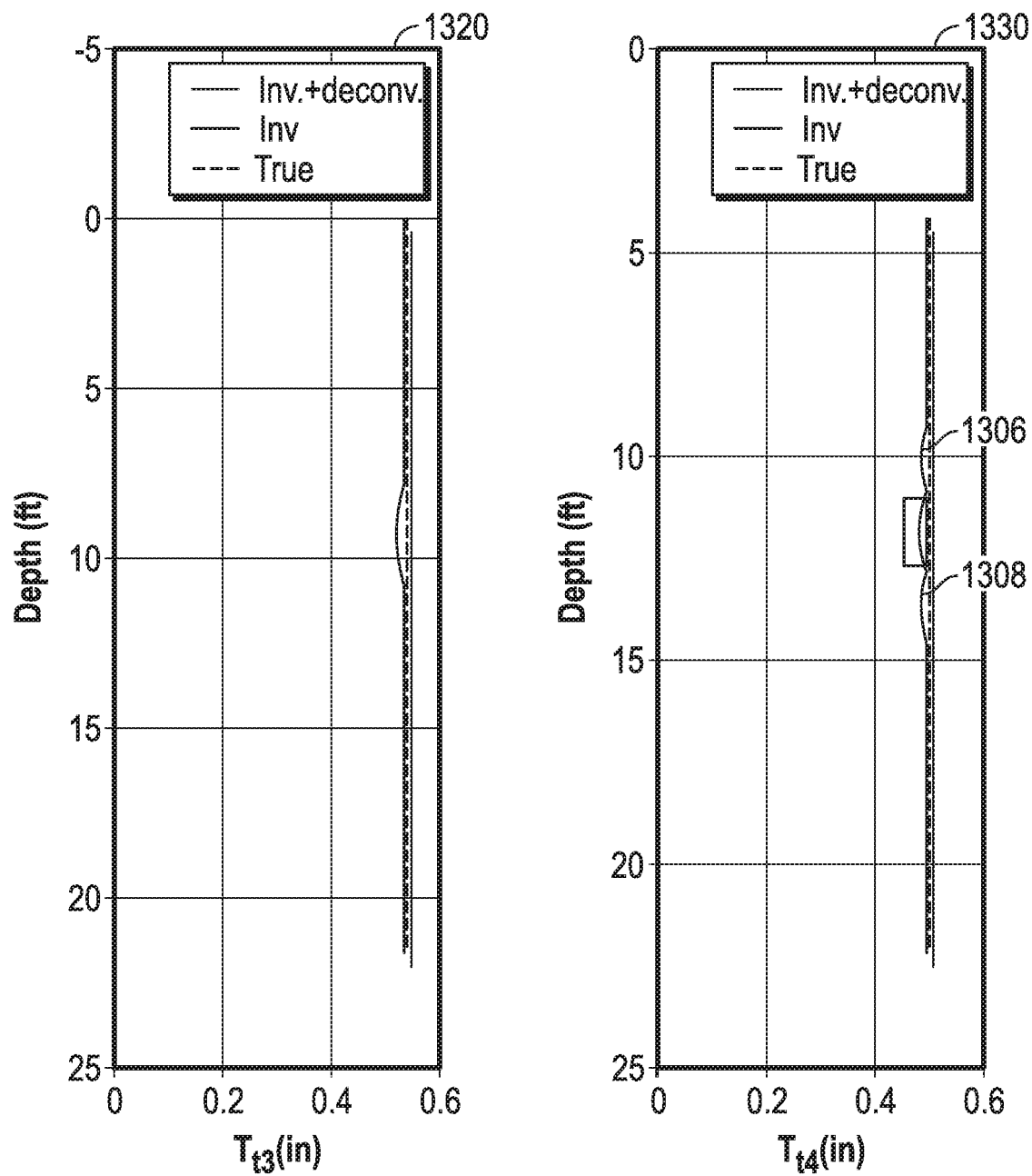

FIGS. 13A-13B illustrate one adjustment after applying algorithms of Equations (7) and (8) in accordance with various embodiments. Methods in accordance with various embodiments will apply the adjustment process of Equation (7), and next apply the adjustments of Equation (8) to the result of execution of Equation (7). In the illustrated example, $G_1$ and $G_2$ (from Equation (8)) are selected to be rectangular windows such that $G_1$ only covers the main peak in the restored thickness function $T_{rm}(z)$ and $G_2$ covers the double peak in the original thickness estimation $T_m(z)$. In FIG. 13A, it is noted that the response 1302 for pipe 202 and the response 1304 for pipe 204 after the adjustment of Equation (8) is not significantly changed. In FIG. 13B, it is observed that the response 1306 for pipe 208 approaches the true thickness values 1308.

Figure 14A:
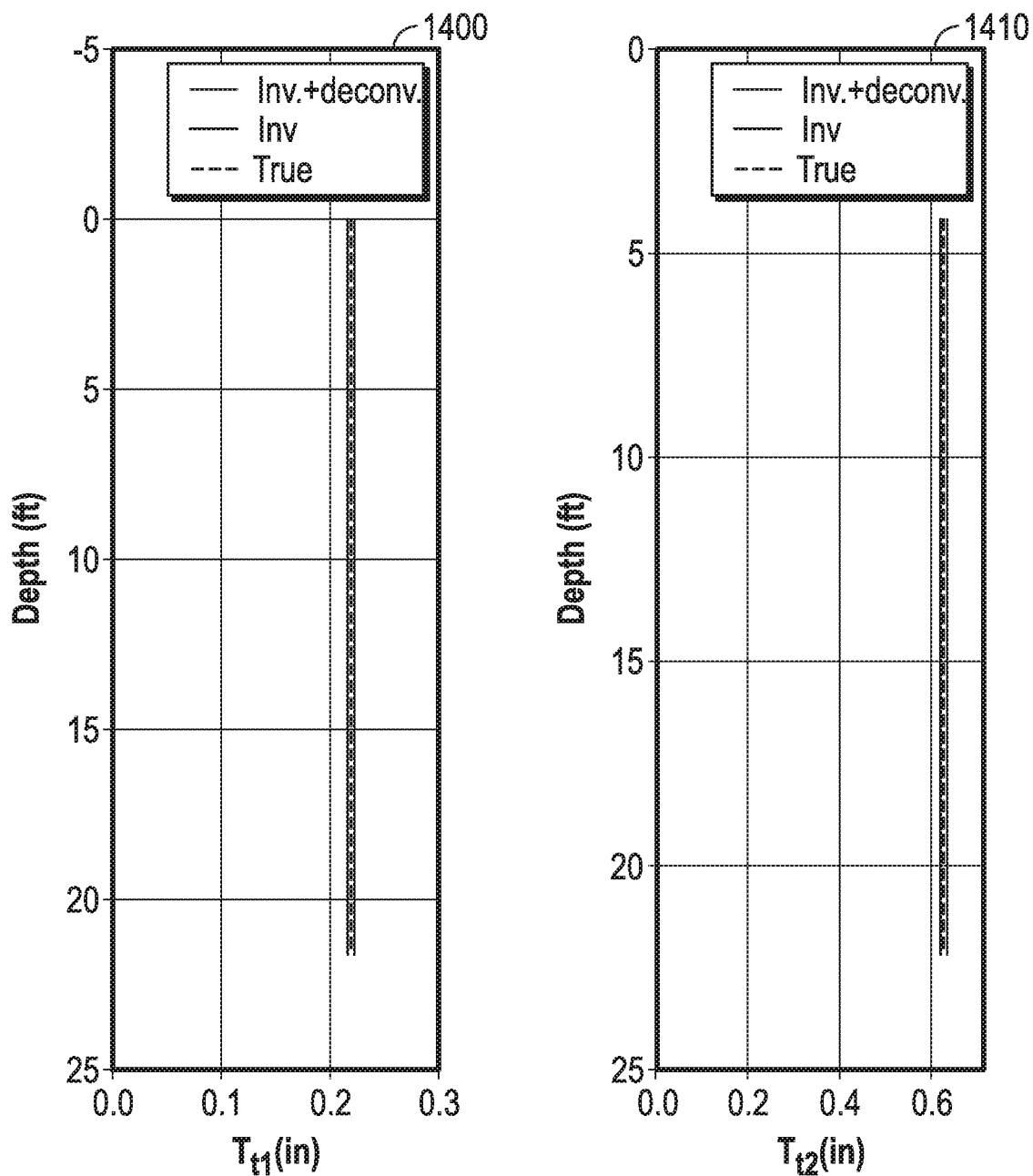
FIGS. 14A and 14B illustrate adjustment of restored thickness values such that the peak for the restored thickness on the fourth pipe becomes two times larger than the largest peak in the original estimated thickness variation, in accordance with various embodiments.
Figure 14B:
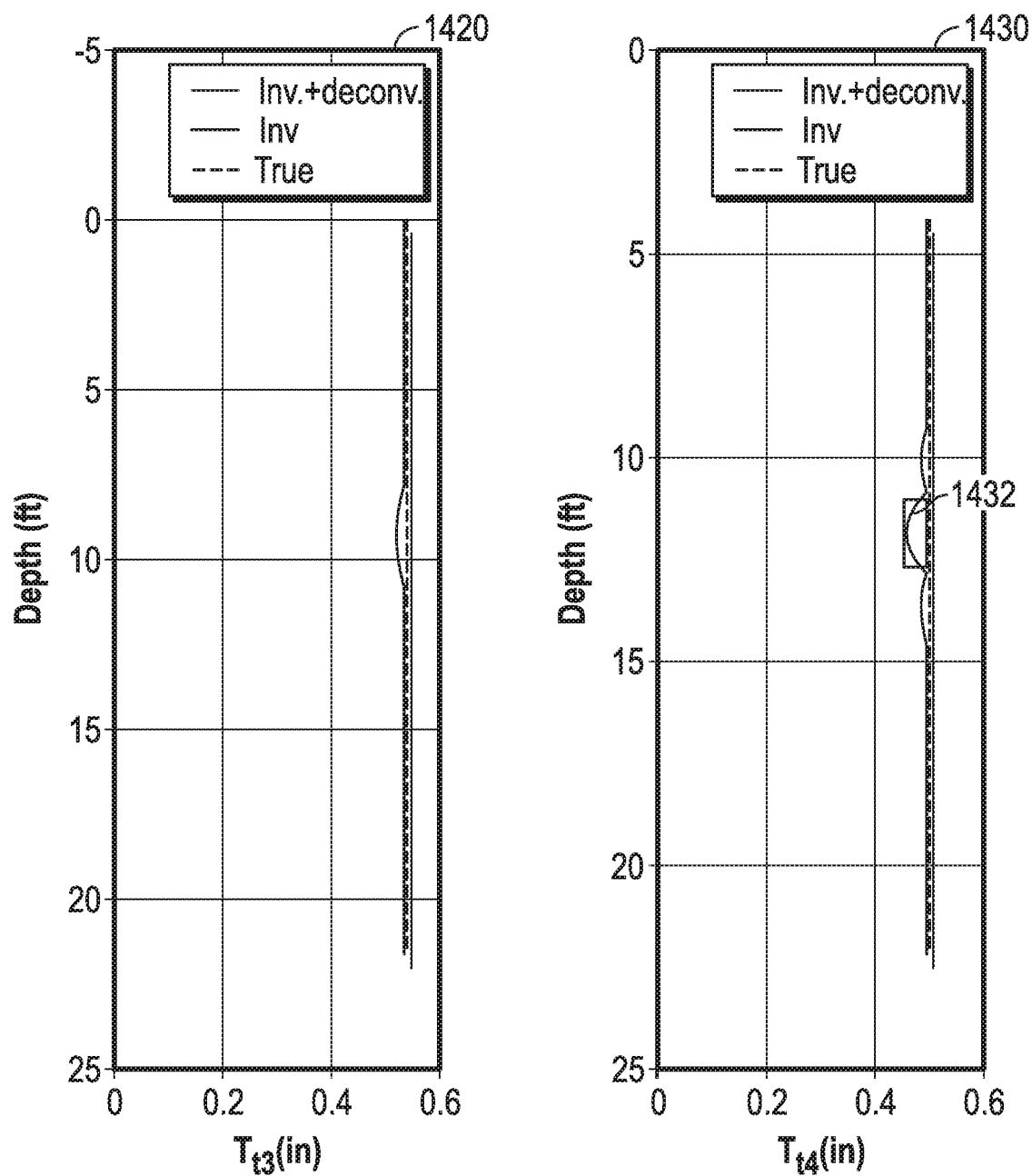

Further adjustment can be performed by providing a proper coefficient $d_m$ (as discussed above with respect to Equation (9) after adjustment of Equation (7) of the thickness values. FIGS. 14A and 14B illustrate adjustment of restored thickness values such that the peak for the restored thickness on the fourth pipe becomes two times larger than the largest peak in the original estimated thickness variation, in accordance with various embodiments. In the example illustrated in FIGS. 14A and 14B, a coefficient of 2 has been applied to make the main peak in the restored thickness function two times larger than the largest peak in the original double peak thickness estimation function. It can be observed that the restored thickness value at the main peak 1432 for pipe 208 (FIG. 14B) is becoming very close to the true thickness value for the defected region. FIG. 14A illustrates that restored thickness values remain relatively unchanged after application of Equation (9).

Example Methods, Systems, and Apparatuses

Figure 15:
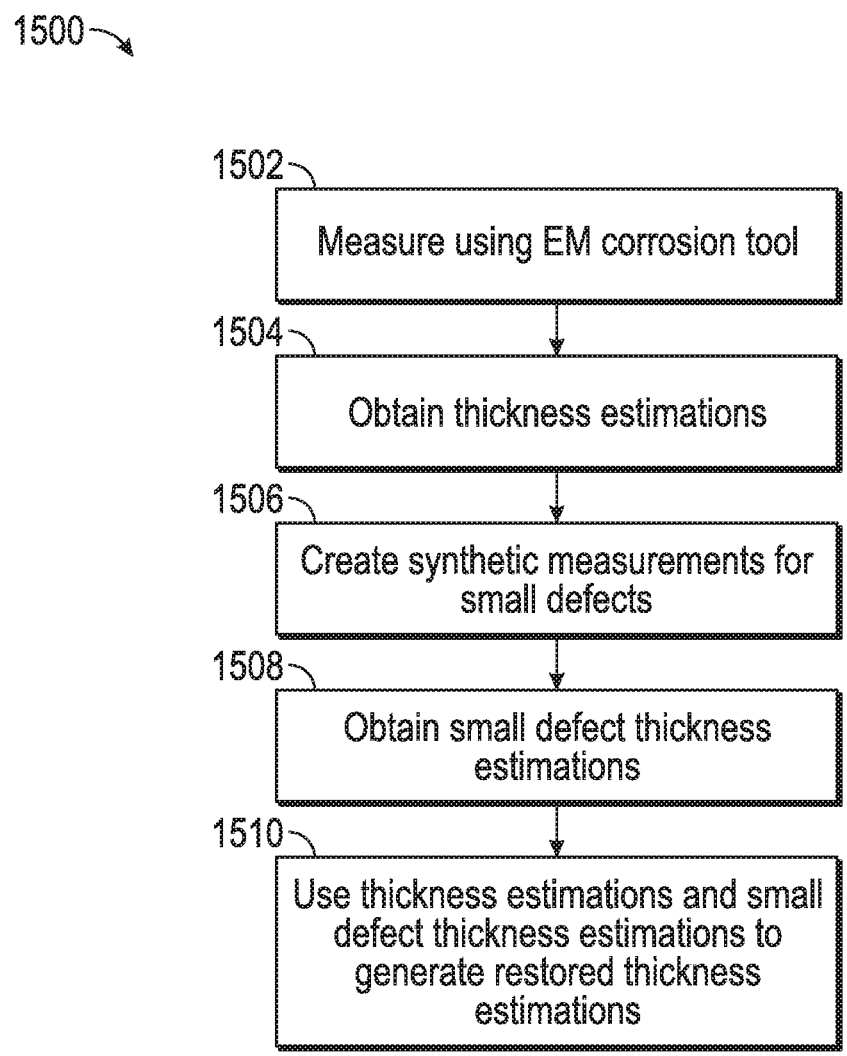
FIG. 15 is a flow diagram of features of an example method of determining thickness of multiple nested conductive pipes, in accordance with various embodiments.

The algorithms described herein can be executed in various example methods to enhance the resolution and remove ghost effects in inversion results in order to provide an accurate interpretation of logs obtained from a corrosion detection tool based on eddy currents. FIG. 15 is a flow diagram of features of one such example method 1500 of determining thickness of multiple nested conductive pipes, in accordance with various embodiments.

Example method 1500 begins with operation 1502 with the control circuitry 1630 generating a set of log measurements using an electromagnetic pulsed tool (e.g., the electromagnetic logging tool 108) disposed in multiple nested conductive pipes (e.g., the pipes 202, 204, 206, 208) in a wellbore, and forming a measured log having measurement data at different depths in the multiple nested conductive pipes.

The example method 1500 continues with operation 1504 with the control circuitry 1630 processing the set of log measurements to generate thickness estimations of the multiple nested conductive pipes.

The example method 1500 continues with operation 1506 with the control circuitry 1630 generating a set of small defect log measurements based on at least one of the multiple nested conductive pipes having a small defect. In some embodiments, the set of small defect log measurements are retrieved from a library of small defect log measurements, wherein the library was generated using measurements of an experimental setup of multiple nested conductive pipes. In some embodiments, the set of small defect log measurements generated using forward modeling.

The example method 1500 continues with operation 1508 with the control circuitry 1630 processing the set of small defect log measurements to generate small defect thickness estimations. In some embodiments, the control circuitry 1630 can process the set of log measurements and the set of small defect log measurements by applying a one-dimensional (1D) inversion algorithm to generate the thickness estimations of the multiple nested conductive pipes and the small defect thickness estimations.

The example method 1500 continues with operation 1510 with the control circuitry 1630 solving a system of equations involving the thickness estimations and the small defect thickness estimations to generate a set of curves that represent thickness variations for the multiple nested conducted pipes over the different depths. In some embodiments, solving the system of equations includes applying a Fourier transform to the system of equations. In some embodiments, solving the system of equations includes applying a multidimensional deconvolution to the system of equations.

The example method 1500 can include the control circuitry 1630 adjusting thickness variations for the multiple nested conducted pipes over the different depths by multiplying, by a coefficient, the maximum values of the set of curves that represent thickness variations to the maximum values of the set of curves that represent estimated thickness variations. In some embodiments, the example method 1500) can include determining depth ranges within the wellbore for which defects are present in at least one pipe of the multiple nested conductive pipes; determining a value for the coefficient at each of the depth ranges; and adjusting thickness variations at each of the depth ranges by the value for the coefficient at the corresponding depth range.

The example method 1500 can include other operations executed by the control circuitry 1630 or other components of the system 1600, including display of any of the described measurement logs, or including execution of algorithms making use of any of Equations (1)-(9). Embodiments that implement method 1500 and other methods described herein can enhance resolution and remove the ghost effect in inversion results in order to better detect corrosion in pipes used in hydrocarbon production processes. The disclosed thickness restoration algorithm can enable operators to accurately interpret logs obtained from a corrosion detection tool based on eddy currents to target remedial efforts.

Figure 16:
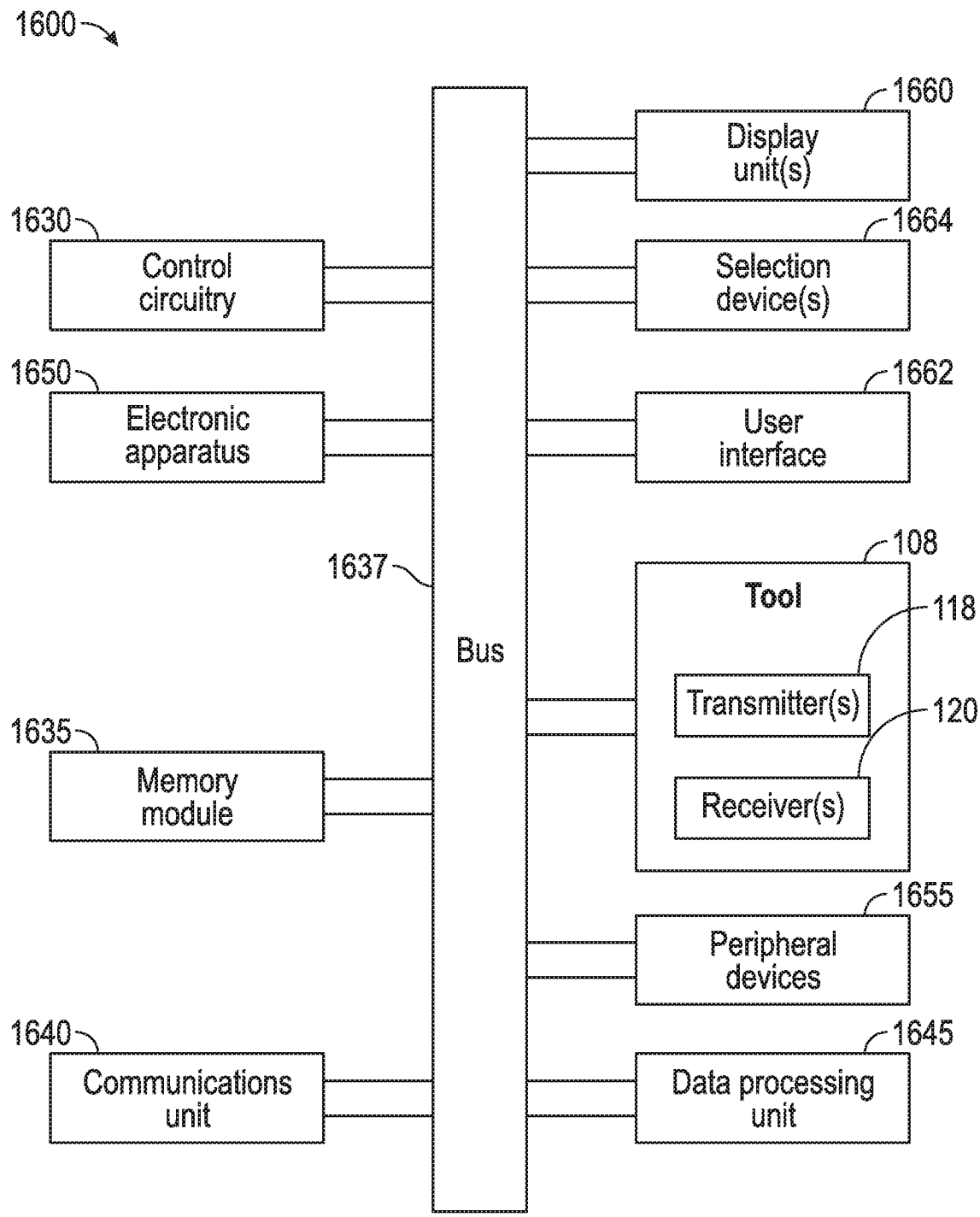
FIG. 16 is a block diagram of features of an example system operable to execute schemes associated with investigation of multiple nested conductive pipes, in accordance with various embodiments.

FIG. 16 is a block diagram of features of an embodiment of an example system 1600 operable to execute schemes associated with investigation of multiple nested conductive pipes. The system 1600 can be implemented at a well site to, among other things, determine thickness of multiple nested conductive pipes. The system 1600 may also be implemented to determine the thickness of the individual pipes of the multiple nested conductive pipes. Such thickness determination can be used to investigate defects in the multiple nested conductive pipes. The multiple nested conductive pipes may be a production structure of the well site.

The system 1600 can comprise an electromagnetic logging tool 108 having one or more transmitter coils 118 and one or more receiver coils 120. The one or more transmitter coils 118 and the one or more receiver coils 120 can be realized as transmitter coils 118 and receiver coils 120. The electromagnetic logging tool 108 can be realized as an electromagnetic pulsed tool having a transmitter coil 118 and a receiver coil 120 arranged such the receiver coil 120 receives a secondary field in response to a primary field generated from the transmitter coil 118. As noted, the transmitter coil 118 may be part of a set of transmitter coils and the receiver coil 120 may be part of a set of receiver coils. The transmitter coil 118 and the receiver coil 120 can be collocated on the electromagnetic logging tool 108. The set of receiver coils 120 and/or the set of transmitter coils 118 can be arranged in a manner similar to or identical to arrangements as taught herein.

The electromagnetic logging tool 108 may be operably disposed in the multiple nested conductive pipes being investigated in a wellbore. The electromagnetic logging tool 108 can be moved along a longitudinal axis of the electromagnetic logging tool 108 and/or a longitudinal axis of the multiple nested conductive pipes being investigated using conventional mechanisms of the oil and gas industry, such as but limited to, wireline operations. Features of the electromagnetic logging tool 108 and variations thereof may be similar to or identical tools as discussed herein.

The system 1600 can also comprise control circuitry 1630. The control circuitry 1630 can be arranged to control variable current levels to the set of transmitters to excite the selected ones of the pipes being investigated. The control circuitry 1630 can be realized as one or more processors. In an embodiment, control circuitry 1630 can be realized as a single processor or a group of processors. Processors of the group of processors may operate independently depending on an assigned function. The control circuitry 1630 can be realized as one or more application-specific integrated circuits (ASICs). The control circuitry 1630 can be arranged to determine total thickness of the multiple nested conductive pipes and the thickness of individual pipes of the multiple nested conductive pipes based on the received responses at the receivers using RFEC processing as taught herein.

The control circuitry 1630, for example using one or more processors, can be arranged to generate a set of log measurements using an electromagnetic logging tool 108 disposed in multiple nested conductive pipes in a wellbore, and forming a measured log having measurement data at different depths in the multiple nested conductive pipes. The control circuitry 1630, for example using one or more processors, can be arranged to determine total thickness of the multiple nested conductive pipes at each depth in the measured log by processing the set of log measurements to generate thickness estimations of the multiple nested conductive pipes. The control circuitry 1630 can also generate a set of small defect log measurements based on at least one of the multiple nested conductive pipes having a small defect. This set of small defect log measurements can be retrieved from a library (e.g., a library stored in memory module 1635).

The control circuitry 1630, for example using one or more processors, can be arranged to process the set of small defect log measurements to generate small defect thickness estimations. The control circuitry 1630 can solve a system of equations (e.g., Equations (4), (5), or (6)) involving the thickness estimations and the small defect thickness estimations to generate a set of curves that represent thickness variations for the multiple nested conducted pipes over the different depths.

The control circuitry 1630, for example using one or more processors, can be arranged to direct remedial operations with respect to the multiple nested conductive pipes in response to determination of the total thickness of the multiple nested conductive pipes or estimation of the thickness of individual pipes of the multiple nested conductive pipes.

In controlling operation of the components of system 1600 to execute schemes associated with investigation of multiple nested conductive pipes, the control circuitry 1630 can direct access of data to and from a database. The database can include parameters and/or expected parameters for the pipes being investigated such as, but not limited to, diameter (d), magnetic permeability ($\mu$), and electrical conductivity ($\sigma$).

The system 1600 can include a user interface 1662 operable with the control circuitry 1630, a data processing unit 1645 operable with the user interface 1662, where the control circuitry 1630, the user interface 1662, and the data processing unit 1645 are structured to be operated according to any scheme similar to or identical to the schemes associated with determining thickness in multiple nested conductive pipes as taught herein. The thickness determination can be used to determine defects in pipes of the multiple nested conductive pipe structure. The system 1600 can be arranged to perform various operations on the data, acquired from the electromagnetic logging tool 108 operational in a multiple nested conductive pipes structure, in a manner similar or identical to any of the processing techniques discussed herein.

The system 1600 can be arranged as a distributed system. Data from operating the electromagnetic logging tool 108 at various depths in the multiple nested conductive pipes structure can be processed by the control circuitry 1630. Alternatively, thickness analysis and subsequent defect analysis may be conducted by the data processing unit 1645 as a dedicated analysis module.

The system 1600 can include a memory module 1635, an electronic apparatus 1650, and a communications unit 1640. The control circuitry 1630, the memory module 1635, and the communications unit 1640 can be arranged to operate as a processing unit to control management of electromagnetic logging tool 108 and to perform operations on data signals collected by the electromagnetic logging tool 108. The memory module 1635 can include a database having information and other data such that the system 1600 can operate on data from the electromagnetic logging tool 108. In an embodiment, the data processing unit 1645 can be distributed among the components of the system 1600 including memory module 1635 and/or the electronic apparatus 1650.

The communications unit 1640 can include downhole communications (e.g., the communications unit 1640 can be included in telemetry circuitry 122 (FIG. 1)) for communication to the surface at a well site from the electromagnetic logging tool 108 in a multi-pipe structure. The communications unit 1640 may use combinations of wired communication technologies and wireless technologies at frequencies that do not interfere with on-going measurements. The communications unit 1640 can allow for a portion or all of the data analysis to be conducted within a multiple nested conductive pipes structure with results provided to the user interface 1662 for presentation on the one or more display unit(s) 1660 aboveground. The communications unit 1640 can provide for data to be sent aboveground such that substantially all analysis is performed aboveground. The data collected by the electromagnetic logging tool 108 can be stored with the electromagnetic logging tool 108 that can be brought to the surface to provide the data to the control circuitry 1630, the user interface 1662, and the data processing unit 1645. The communications unit 1640 can allow for transmission of commands to electromagnetic logging tool 108 in response to signals provided by a user through the user interface 1662. Such commands may be generated from autonomous operation of the system 1600, once initiated.

The system 1600 can also include a bus 1637, where the bus 1637 provides electrical conductivity among the components of the system 1600. The bus 1637 can include an address bus, a data bus, and a control bus, each independently configured. The bus 1637 can be realized using a number of different communication mediums that allows for the distribution of components of the system 1600. Use of the bus 1637 can be regulated by the control circuitry 1630. The bus 1637 can include a communications network to transmit and receive signals including data signals and command and control signals.

In various embodiments, peripheral devices 1655 can include drivers to provide voltage and/or current input to the set of transmitter coils 118, additional storage memory and/or other control devices that may operate in conjunction with the processor(s) 1630 and/or the memory module 1635. The display unit(s) 1660 can be arranged with a screen display, as a distributed component on the surface with respect to a well site, which can be used with instructions stored in the memory module 1635 to implement the user interface 1662 to manage the operation of the electromagnetic logging tool 108 and/or components distributed within the system 1600. Such a user interface can be operated in conjunction with the communications unit 1640 and the bus 1637. The display unit(s) 1660 can include a video screen, a printing device, or other structure to visually project data/information and images. The system 1600 can include a number of selection devices 1664 operable with the user interface 1662 to provide user inputs to operate the data processing unit 1645 or its equivalent. The selection device(s) 1664 can include one or more of a touch screen, a computer mouse, or other control device operable with the user interface 1662 to provide user inputs to operate the data processing unit 1645 or other components of the system 1600.

In various embodiments, a non-transitory machine-readable storage device can comprise instructions stored thereon, which, when performed by a machine, cause the machine to perform operations, the operations comprising one or more features similar to or identical to features of methods and techniques described with respect to any methods described herein or variations thereof, associated with FIGS. 1-16. The physical structures of such instructions may be operated on by one or more processors (e.g., control circuitry 1630). Executing these physical structures can cause the machine to perform operations comprising: generating a set of log measurements using an electromagnetic pulsed tool disposed in multiple nested conductive pipes in a wellbore, and forming a measured log having measurement data at different depths in the multiple nested conductive pipes; processing the set of log measurements to generate thickness estimations of the multiple nested conductive pipes; generating a set of small defect log measurements based on at least one of the multiple nested conductive pipes having a small defect; processing the set of small defect log measurements to generate small defect thickness estimations: and solving a system of equations involving the thickness estimations and the small defect thickness estimations to generate a set of curves that represent thickness variations for the multiple nested conducted pipes over the different depths. Execution of various instructions may be realized by the control circuitry of the machine. The instructions can include instructions to operate a tool or tools having sensors disposed in multiple nested conductive pipes in a wellbore to provide data to process in accordance with the teachings herein. The multiple nested conductive pipes may be realized as a multi-pipe structure disposed in a wellbore at a well site. Such machine-readable storage devices can include instructions to use an electromagnetic pulsed tool.

The operations can include estimating thickness of individual pipes of the multiple nested conductive pipes, wherein estimating thickness of individual pipes of the multiple nested conductive pipes includes estimating the thickness of the individual pipes sequentially, starting from the innermost pipe. The operations can further include directing remedial operations with respect to the multiple nested conductive pipes in response to determining the total thickness of the multiple nested conductive pipes or estimating the thickness of individual pipes of the multiple nested conductive pipes. The operations can further include exploration, drilling, logging, completion or production operational decision based on the thickness variations. For example, in the case of a metal loss exceeding a threshold, a repeat a more detailed log of the section of the pipe with the excessive loss may be performed. The threshold may be between 5 percent and 30 percent. As another example, a decision to abandon the well may be taken.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 1635. While memory module 1635 is shown as a single unit, terms such as "memory module," "machine-readable medium" "machine-readable device." and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory: cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device." "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

The following are example embodiments of methods, machine-readable storage devices, and systems in accordance with the teachings herein.

Example 1 is a method comprising: measuring electromagnetic response signals using an electromagnetic pulsed tool disposed in multiple nested conductive pipes in a wellbore, and forming a measured log having measurement data at different depths in the multiple nested conductive pipes; processing a set of log measurements based on the electromagnetic response signals to generate thickness estimations of the multiple nested conductive pipes; generating a set of small defect log measurements based on at least one of the multiple nested conductive pipes having a small defect; processing the set of small defect log measurements to generate small defect thickness estimations; and solving a system of equations involving the thickness estimations and the small defect thickness estimations to generate a set of curves that represent thickness variations for the multiple nested conducted pipes over the different depths.

In Example 2, the subject matter of Example 1 can optionally include wherein the set of small defect log measurements are retrieved from a library of small defect log measurements, wherein the library was generated using measurements of an experimental setup of multiple nested conductive pipes.

In Example 3, the subject matter of any of Examples 1-2 can optionally include wherein the set of synthetic log measurements is generated using forward modeling.

In Example 4, the subject matter of Example 1 can optionally include wherein processing the set of log measurements and processing the set of small defect log measurements includes applying a one-dimensional (1D) inversion algorithm to generate the thickness estimations of the multiple nested conductive pipes and to generate small defect thickness estimations.

In Example 5, the subject matter of Example 1 can optionally include wherein solving the system of equations includes applying a Fourier transform to the system of equations.

In Example 6, the subject matter of Example 1 can optionally include wherein solving the system of equations includes applying a multi-dimensional deconvolution to the system of equations.

In Example 7, the subject matter of Example 6 can optionally comprise adjusting thickness variations for the multiple nested conducted pipes over the different depths by multiplying, by a coefficient, the maximum values of the set of curves that represent thickness variations to the maximum values of the set of curves that represent estimated thickness variations.

In Example 8, the subject matter of Example 7 can optionally include determining depth ranges within the wellbore for which defects are present in at least one pipe of the multiple nested conductive pipes; determining a value for the coefficient at each of the depth ranges; and adjusting thickness variations at each of the depth ranges by the value for the coefficient at the corresponding depth range.

In Example 9, the subject matter of Example 8 can optionally include directing remedial operations with respect to the multiple nested conductive pipes in response to determining the thickness variations for pipes.

In Example 10, the subject matter of Example 8 can optionally include directing remedial operations with respect to at least one pipe of the multiple nested conductive pipes responsive to detecting, on the at least one pipe, presence of a defect having a dimension greater than a threshold dimension.

In Example 11, the subject matter of any of Examples 1-10 can optionally include making a exploration, drilling, logging, completion or production operational decision based on the thickness variations.

Example 12 includes a machine-readable storage device having instructions (e.g., software, firmware, etc.) stored thereon, which, when executed by a machine, cause the machine to perform operations, the operations comprising: generating a set of log measurements obtained using an electromagnetic pulsed tool disposed in multiple nested conductive pipes in a wellbore, and forming a measured log having measurement data at different depths in the multiple nested conductive pipes; processing the set of log measurements to generate thickness estimations of the multiple nested conductive pipes; generating a set of small defect log measurements based on at least one of the multiple nested conductive pipes having a small defect; processing the set of small defect log measurements to generate small defect thickness estimations; and solving a system of equations involving the thickness estimations and the small defect thickness estimations to generate a set of curves that represent thickness variations for the multiple nested conducted pipes over the different depths.

In Example 13, the subject matter of Example 12 can optionally include wherein the set of synthetic log measurements are retrieved from a library of small defect log measurements, wherein the library was generated using measurements of an experimental setup of multiple nested conductive pipes.

In Example 14, the subject matter of Example 12 can optionally include wherein processing the set of log measurements and processing the set of small defect log measurements includes applying a one-dimensional (1D) inversion algorithm to generate the thickness estimations of the multiple nested conductive pipes and to generate small defect thickness estimations.

In Example 15, the subject matter of Example 12 can optionally include adjusting thickness variations for the multiple nested conducted pipes over the different depths by multiplying, by a coefficient, the maximum values of the set of curves that represent thickness variations to the maximum values of the set of curves that represent estimated thickness variations.

In Example 16, the subject matter of Example 15 can optionally include determining depth ranges within the wellbore for which defects are present in at least one pipe of the multiple nested conductive pipes; determining a value for the coefficient at each of the depth ranges: and adjusting thickness variations at each of the depth ranges by the value for the coefficient at the corresponding depth range.

In Example 17, the subject matter of Example 16 can optionally include directing remedial operations with respect to the multiple nested conductive pipes in response to determining the thickness variations for pipes.

In Example 18, the subject matter of Example 16 can optionally include directing remedial operations with respect to at least one pipe of the multiple nested conductive pipes responsive to detecting, on the at least one pipe, presence of a defect having a dimension greater than a threshold dimensions.

Example 19 is a system (e.g., a pipe system, pipe characterization system, or other detection system) comprising: a tool, the tool being an electromagnetic pulsed tool having a transmitter coil and a receiver coil arranged such the receiver coil receives a secondary field in response to a primary field generated from the transmitter coil; and control circuitry configured to: evaluate multiple nested conductive pipes in a wellbore from a set of log measurements acquired by use of the tool disposed in the multiple nested conductive pipes operable to form a measured log of measurement data at different depths in the multiple nested conductive pipes: process the set of log measurements to generate thickness estimations of the multiple nested conductive pipes; generate a set of small defect log measurements based on at least one of the multiple nested conductive pipes having a small defect; process the set of small defect log measurements to generate small defect thickness estimations; and solve a system of equations involving the thickness estimations and the small defect thickness estimations to generate a set of curves that represent thickness variations for the multiple nested conducted pipes over the different depths.

In Example 20, the subject matter of Example 19 can optionally include wherein processing the set of log measurements and processing the set of small defect log measurements includes applying a one-dimensional (1D) inversion algorithm to generate the thickness estimations of the multiple nested conductive pipes and to generate small defect thickness estimations.

In Example 21, the subject matter of Example 19 can optionally include wherein the control circuitry is further configured to adjust thickness variations for the multiple nested conducted pipes over the different depths by multiplying, by a coefficient, the maximum values of the set of curves that represent thickness variations to the maximum values of the set of curves that represent estimated thickness variations.

In Example 22, the subject matter of any of Examples 19-21 can optionally include wherein the control circuitry is arranged to direct remedial operations with respect to the multiple nested conductive pipes in response to determination of the total thickness of the multiple nested conductive pipes or estimation of the thickness of individual pipes of the multiple nested conductive pipes.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   measuring electromagnetic response signals using an electromagnetic pulsed tool disposed in multiple nested conductive pipes in a wellbore, and forming a measured log having measurement data at different depths in the multiple nested conductive pipes;
   processing a set of log measurements based on the electromagnetic response signals to generate thickness estimations of the multiple nested conductive pipes;
   generating a set of small defect log measurements based on at least one of the multiple nested conductive pipes having a small defect;
   processing the set of small defect log measurements to generate small defect thickness estimations; and
   solving a system of equations involving the thickness estimations and the small defect thickness estimations to generate a set of curves that represent thickness variations for the multiple nested conducted pipes over the different depths.

2. The method of claim 1, wherein the set of small defect log measurements are retrieved from a library of small defect log measurements, wherein the library was generated using measurements of an experimental setup of multiple nested conductive pipes.

3. The method of claim 1, wherein the set of synthetic log measurements is generated using forward modeling.

4. The method of claim 1, wherein processing the set of log measurements and processing the set of small defect log measurements includes applying a one-dimensional (1D) inversion algorithm to generate the thickness estimations of the multiple nested conductive pipes and to generate small defect thickness estimations.

5. The method of claim 1, wherein solving the system of equations includes applying a Fourier transform to the system of equations.

6. The method of claim 1, wherein solving the system of equations includes applying a multi-dimensional deconvolution to the system of equations.

7. The method of claim 1, further comprising:
   adjusting thickness variations for the multiple nested conducted pipes over the different depths by multiplying, by a coefficient, the maximum values of the set of curves that represent thickness variations to the maximum values of the set of curves that represent estimated thickness variations.

8. The method of claim 7, further comprising:
   determining depth ranges within the wellbore for which defects are present in at least one pipe of the multiple nested conductive pipes:
   determining a value for the coefficient at each of the depth ranges; and
   adjusting thickness variations at each of the depth ranges by the value for the coefficient at the corresponding depth range.

9. The method of claim 8, further comprising:
   directing remedial operations with respect to the multiple nested conductive pipes in response to determining the thickness variations for pipes.

10. The method of claim 8, further comprising:
    directing remedial operations with respect to at least one pipe of the multiple nested conductive pipes responsive to detecting, on the at least one pipe, presence of a defect having a dimension greater than a threshold dimension.

11. The method of claim 1, further comprising:
    making a exploration, drilling, logging, completion or production operational decision based on the thickness variations.

12. A machine-readable storage device having instructions stored thereon, which, when executed by control circuitry of a machine, cause the machine to perform operations, the operations comprising:
    generating a set of log measurements obtained using an electromagnetic pulsed tool disposed in multiple nested conductive pipes in a wellbore, and forming a measured log having measurement data at different depths in the multiple nested conductive pipes;
    processing the set of log measurements to generate thickness estimations of the multiple nested conductive pipes:
    generating a set of small defect log measurements based on at least one of the multiple nested conductive pipes having a small defect:
    processing the set of small defect log measurements to generate small defect thickness estimations; and
    solving a system of equations involving the thickness estimations and the small defect thickness estimations to generate a set of curves that represent thickness variations for the multiple nested conducted pipes over the different depths.

13. The machine-readable storage device of claim 12, wherein the set of synthetic log measurements are retrieved from a library of small defect log measurements, wherein the library was generated using measurements of an experimental setup of multiple nested conductive pipes.

14. The machine-readable storage device of claim 12, wherein processing the set of log measurements and processing the set of small defect log measurements includes applying a one-dimensional (1D) inversion algorithm to generate the thickness estimations of the multiple nested conductive pipes and to generate small defect thickness estimations.

15. The machine-readable storage device of claim 12, wherein the instructions cause the machine to perform operations comprising:
adjusting thickness variations for the multiple nested conducted pipes over the different depths by multiplying, by a coefficient, the maximum values of the set of curves that represent thickness variations to the maximum values of the set of curves that represent estimated thickness variations.

16. The machine-readable storage device of claim 15, wherein the instructions cause the machine to perform operations comprising:
determining depth ranges within the wellbore for which defects are present in at least one pipe of the multiple nested conductive pipes;
determining a value for the coefficient at each of the depth ranges; and
adjusting thickness variations at each of the depth ranges by the value for the coefficient at the corresponding depth range.

17. The machine-readable storage device of claim 16, wherein the instructions cause the machine to perform operations comprising:
directing remedial operations with respect to the multiple nested conductive pipes in response to determining the thickness variations for pipes.

18. The machine-readable storage device of claim 16, wherein the instructions cause the machine to perform operations comprising:
directing remedial operations with respect to at least one pipe of the multiple nested conductive pipes responsive to detecting, on the at least one pipe, presence of a defect having a dimension greater than a threshold dimension.

19. A system comprising:
a tool, the tool being an electromagnetic pulsed tool having a transmitter coil and a receiver coil arranged such the receiver coil receives a secondary field in response to a primary field generated from the transmitter coil; and
control circuitry configured to:
evaluate multiple nested conductive pipes in a wellbore from a set of log measurements acquired by use of the tool disposed in the multiple nested conductive pipes operable to form a measured log of measurement data at different depths in the multiple nested conductive pipes;
process the set of log measurements to generate thickness estimations of the multiple nested conductive pipes;
generate a set of small defect log measurements based on at least one of the multiple nested conductive pipes having a small defect;
process the set of small defect log measurements to generate small defect thickness estimations; and
solve a system of equations involving the thickness estimations and the small defect thickness estimations to generate a set of curves that represent thickness variations for the multiple nested conducted pipes over the different depths.

20. The system of claim 19, wherein processing the set of log measurements and processing the set of small defect log measurements includes applying a one-dimensional (1D) inversion algorithm to generate the thickness estimations of the multiple nested conductive pipes and to generate small defect thickness estimations.

21. The system of claim 19, wherein the control circuitry is further configured to adjust thickness variations for the multiple nested conducted pipes over the different depths by multiplying, by a coefficient, the maximum values of the set of curves that represent thickness variations to the maximum values of the set of curves that represent estimated thickness variations.

22. The system of claim 19, wherein the control circuitry is arranged to direct remedial operations with respect to the multiple nested conductive pipes in response to determination of the total thickness of the multiple nested conductive pipes or estimation of the thickness of individual pipes of the multiple nested conductive pipes.

* * * * *